US010662327B2

(12) United States Patent
Nelson et al.

(10) Patent No.: US 10,662,327 B2
(45) Date of Patent: May 26, 2020

(54) NANOCELLULOSE NUCLEATING AGENTS FOR CRYSTALLIZATION OF POLYLACTIDES AND OTHER POLYMERS

(71) Applicant: API Intellectual Property Holdings, LLC, Minnetrista, MN (US)

(72) Inventors: Kimberly Nelson, Atlanta, GA (US); Eric A. Mintz, Roswell, GA (US)

(73) Assignee: GranBio Intellectual Property Holdings, LLC, Atlanta, GA (US)

( * ) Notice: Subject to any disclaimer, the term of this patent is extended or adjusted under 35 U.S.C. 154(b) by 0 days.

(21) Appl. No.: 15/797,047

(22) Filed: Oct. 30, 2017

(65) Prior Publication Data

US 2018/0118936 A1 May 3, 2018

Related U.S. Application Data

(60) Provisional application No. 62/414,239, filed on Oct. 28, 2016, provisional application No. 62/447,606, filed on Jan. 18, 2017.

(51) Int. Cl.
*C08L 67/04* (2006.01)
(52) U.S. Cl.
CPC ........... *C08L 67/04* (2013.01); *C08L 2205/03* (2013.01); *C08L 2205/24* (2013.01)
(58) Field of Classification Search
CPC .... C08L 67/04; C08L 1/02; C08L 1/04; C08L 2205/24
See application file for complete search history.

(56) References Cited

U.S. PATENT DOCUMENTS

2012/0283363 A1\* 11/2012 Kumamoto .............. C08J 5/045
524/35
2015/0368441 A1\* 12/2015 Retsina ..................... C08L 1/02
442/59
(Continued)

FOREIGN PATENT DOCUMENTS

JP 2009185244 A \* 8/2009
JP 2015093978 A \* 5/2015
(Continued)

OTHER PUBLICATIONS

Joo Hyung Lee, et al., "Preparation of Cellulose Nanowhiskers and Their Reinforcing Effect in Polylactide," 21 Macromolecular Research 1218, 1218-1225 (2013).\*
(Continued)

*Primary Examiner* — Nicholas E Hill
(74) *Attorney, Agent, or Firm* — O'Connor & Company; Ryan P. O'Connor

(57) ABSTRACT

The invention provides a polymer composition comprising from 50 wt % to 99.9 wt % polymer, from 0.1 wt % to 10 wt % nanocellulose as a first nucleating agent, and from 0.01 wt % to 5 wt % of a second nucleating agent. In some embodiments, the polymer is polylactide, the first nucleating agent is lignin-containing nanocellulose, and the second nucleating agent is a sulfur-containing, oxygenated aromatic molecule. The oxygenated aromatic molecule may be an aromatic sulfonic acid or salt, such as dimethyl 5-sulfoisophthalate. In other embodiments, the sulfur-containing, oxygenated aromatic molecule is lignosulfonic acid. Other variations provide a polymer composition comprising polymer, lignin-containing nanocellulose as a dispersing agent, and additives selected from nucleating agents, compatibilizers, plasticizers, fillers, antioxidants, colorants, or flame retardants. Other variations provide a polymer nucleating agent comprising lignin-containing nanocellulose and a sul-
(Continued)

fur-containing, oxygenated aromatic molecule. This may be a nucleating agent for polylactide, polycaprolactone, polyhydroxybutyrate, polyethylene, or polypropylene, for example.

17 Claims, 6 Drawing Sheets

(56) References Cited

U.S. PATENT DOCUMENTS

| | | | |
|---|---|---|---|
| 2016/0102201 A1* | 4/2016 | Bilodeau | C09D 167/04 524/733 |
| 2016/0297962 A1* | 10/2016 | Nelson | C08J 3/005 |

FOREIGN PATENT DOCUMENTS

| | | | | |
|---|---|---|---|---|
| WO | 2011085058 A1 | 7/2011 | | |
| WO | WO-2011085058 A1 * | 7/2011 | | B29C 45/0001 |
| WO | WO-2015020120 A1 * | 2/2015 | | C08K 5/42 |
| WO | WO-2015200780 A1 * | 12/2015 | | D21C 9/007 |

OTHER PUBLICATIONS

English-language machine translation of JP2009185244, performed on Espacenet website on Dec. 15, 2018.*

English-language machine translation of JP2015093978, performed on Espacenet website on Dec. 15, 2018.*

English-language machine translation of JPW02015020120, performed on Espacenet website on Dec. 15, 2018.*

Heidi Peltola, "Lignin-Compatibilised Biocomposites" in Developments in Advanced Biocomposites, eds. Ali Harlin & Minna Vikman, 49, 49-54 (2010).*

Website showing public availability date of R.Z. Khoo, H. Ismail & W.S. Chow, "Thermal and Morphological Properties of Poly (lactic acid)/Nanocellulose Nanocomposites," 19 Procedia Chemistry 788 (available online Mar. 24, 2016), one page, downloaded on Aug. 24, 2019.*

Gupta et al., "Lignin-coated cellulose nanocrystals as promising nucleating agent for poly(lactic acid)" J Therm Anal Calorim, published online Jul. 2, 2016; DOI 10.1007/s10973-016-5657-6.

Gupta et al., "Rheological and thermo-mechanical properties of poly(lactic acid)/lignin-coated cellulose nanocrystal composites" ACS Sustainable Chem. Eng., Just Accepted Manuscript • DOI: 10.1021/acssuschemeng.6b02458, Publication Date (Web): Jan. 6, 2017.

Khoo et al., "Thermal and Morphological Properties of Poly (lactic acid)/Nanocellulose Nanocomposites" Procedia Chemistry 19 (2016) 788-794.

Lu et al., "Polylactic acid nanocomposite films with spherical nanocelluloses as efficient nucleation agents: effects on crystallization, mechanical and thermal properties" RSC Adv., 2016, 6, 46008.

Sullivan et al., "Processing and Characterization of Cellulose Nanocrystals/Polylactic Acid Nanocomposite Films" Materials 2015, 8, 8106-8116; doi:10.3390/ma8125447.

Takemoto, LAK-301 Nucleating agent for high heat resistance application of new Ingeo™ HP PLA grade, Innovation Takes Root 2014 (Feb. 19, 2014), Takemoto Oil & Fat Co., Ltd., Polymer Additives Division, Masatoshi Sakata.

NatureWorks, "Ingeo™ Biopolymer 2500HP Technical Data Sheet", 2017.

NatureWorks, Ingeo™ Biopolymer 4043D Technical Data Sheet, 2017.

You et al., "Accelerated Crystallization of Poly(lactic acid): Synergistic Effect of Poly(ethylene glycol), Dibenzylidene Sorbitol, and Long-Chain Branching" Ind. Eng. Chem. Res. 2014, 53, 1097-1107.

* cited by examiner

200
NANOCELLULOSE NUCLEATING AGENTS FOR CRYSTALLIZATION OF POLYLACTIDES AND OTHER POLYMERS

PRIORITY DATA

This patent application is a non-provisional application claiming priority to U.S. Provisional Patent App. No. 62/414,239, filed on Oct. 28, 2016, and to U.S. Provisional Patent App. No. 62/447,606, filed on Jan. 18, 2017, which are hereby incorporated by reference herein in their entireties.

FIELD

The present invention generally relates to crystallization of polylactide (PLA) and other polymers.

BACKGROUND

Renewable bio-based polymers and composites derived from natural resources are generating great interest due to depleting fossil fuel resources and the negative environmental impact of fossil fuel-based plastic products. Many biobased polymers have been developed which show great potential for different applications; however, processing and physical properties of these polymers are still not sufficient for many end-user applications. The poor processing and physical properties of these polymers can generally be attributed to low molecular weight, low crystallinity, and high moisture uptake. Improving the processability and physical properties of sustainable bio-based polymers is essential to make them suitable for different end-user applications. For example, polylactide is one of the most important bio-based polymers and it shows great potential in packaging, drug delivery, and biological scaffolds applications. However, the mechanical and processing properties of polylactide alone is not adequate for many of these applications. Crystallization increases the mechanical properties of the polymer.

Polylactide polymers (PLA, sometimes referred to as polylactic acid) are of increasing interest because they can be prepared from annually renewable resources such as corn sugars rather than oil or natural gas feedstocks. PLA resins are also capable of degrading rapidly under some composting conditions to regenerate carbon dioxide. The ability to compost these materials can provide more disposal options for these resins, compared to most other organic polymers. As a result, PLA resins are finding uses in a variety of packaging applications. These packaging applications include a variety of rigid and semi-rigid articles such as clamshell containers, deli and other food service trays and bottles. These packaging products are made mainly by extruding a sheet of the PLA resin and then thermoforming it.

PLA has certain characteristics which greatly affect how it is processed and the types of end-products that can be made from it. For example, the glass transition temperature ($T_g$) of PLA is only about 60° C., which is significantly lower than those of commonly available, high-volume polymers that have use temperatures such that during use they are in the glassy state. This low $T_g$ means that parts made from PLA resins tend not to be very heat-resistant, as even moderately elevated temperatures are sufficient to induce a phase transition and soften the polymer.

One way to improve the heat resistance of a PLA resin is to partially crystallize it. A very significant improvement in heat resistance is seen when 20 J/g or more of crystallinity is induced in a PLA article. This can be done by annealing the part between the $T_g$ and the crystalline melting temperature ($T_m$) of the resin. However, another characteristic of PLA resins is that under quiescent conditions they crystallize very slowly compared to most other common semi-crystalline polymers. This slow crystallization is a practical problem in many manufacturing processes, because the slow crystallization rates lead to very long cycle times. Equipment utilization is decreased and operating expenses are increased due to the slow crystallization rates.

Thermoforming is almost always limited to producing thin-wall articles that can be formed from a starting sheet material. Stretch blow molding processes are limited to producing certain types of hollow articles. In each case, thickness of the resulting parts is restricted. In addition, these processes are not amenable to forming complexly shaped parts.

Injection molding is a method in which thicker, more complex parts can be made. Injection molding starts with a molten polymer which is injected into the mold, and there is no simple way to stretch the polymer (to induce crystallization) within the mold in an injection molding process. Therefore, whereas crystallization is promoted by stretching the part to orient the polymer chains, crystallization must take place in an injection molding process without the benefit of stretching the part. In the injection molding process, quiescent crystallization dominates, rather than stress-induced crystallization.

Therefore, PLA resins have been injection molded, but with only limited ability to form parts which are stable at elevated temperatures. The conventional injection molding process for PLA uses a cold mold, which is at or below the glass transition temperature of the PLA resin. In order to produce reasonable cycle times, the polymer is quenched in the mold by rapidly cooling it to below its $T_g$, so it hardens enough to be demolded. Little crystallization can occur in this process, especially because of the inherently slow crystallization of PLA under quiescent conditions, and so the molded part is not very resistant to elevated temperatures.

If better heat resistance and mechanical properties are desired, it becomes necessary for the PLA resin to become more highly crystallized. This can be done on injection molded parts after they have been demolded, by conducting an annealing step during which the PLA resin is heated to about 70° C. to 130° C. for a period of time. This annealing step can cause the part to warp or shrink if the part is not constrained. In addition, this increases manufacturing costs substantially, and correspondingly higher equipment and energy costs are incurred. It is better to promote PLA crystallization while the part is still in the mold. This can be done by bringing the temperature of the part to 70° C. to 130° C. for a period of time before the part is demolded.

However, because PLA is inherently slow to quiescently crystallize, and because there is no possibility to stretch the polymer, it takes a long time for the part to develop the wanted crystallinity. Furthermore, the part tends to be softer at the higher temperatures needed to crystallize it within the mold, because it is kept above its $T_g$. This can make the part more difficult to eject, because of sticking to the mold and the possibility of distorting the part as it is removed. For these reasons, cycle times become very long in injection molding processes, if it is attempted to perform the crystallization step while the part is in the mold with conventional PLA molding compositions. PLA resins for injection molding processes generally have moderate molecular weights (such as a weight average molecular weight of 100,000 g/mol or less), to facilitate the process through a lower melt viscosity and faster crystallization rates. However, crystallization rates are still too slow to provide economically feasible cycle times.

A shorter cycle time is needed for the process to be economically viable. Various nucleating agents and plasticizers have been used in some processes, in order to increase the crystallization rate of PLA. Among these are materials such as talc, ethylene bis(stearamide), polyethylene glycol, acetyl-tributyl citrate, and tributyl citrate. These can provide various levels of improvement in manufacturing processes which require the polymer to be crystallized quiescently. However, these have not been found to reduce cycle times sufficiently, and manufacturing rates remain slow in an injection molding process. In general, these nucleating agents work for cold crystallization, in which the polymer and nucleating agent are heated to about 80-140° C. and the crystallization occurs in the solid state. It is only very rare that PLA crystalizes from the melt, even with nucleating agents.

Therefore, it is desirable to provide a PLA resin composition which can be processed rapidly in an injection molding process, to produce a crystalline or semi-crystalline molded product. Crystallization from the melt is important for injection molding, allowing short cycle times and no need to reheat the product for cold crystallization.

In addition to improved heat stability, PLA with higher crystallinity is expected to be less susceptible to hydrolytic degradation of the polymer and have better mechanical properties for some applications. It is especially desirable to provide bio-based nucleating agents for PLA.

Nucleation is important to a wide range of polymers, not just PLA. For example, nucleation is important in other biopolymers such as polycaprolactone (PCL) and polyhydroxybutyrate (PHB), among others, and non-biopolymers such as polyethylene (PE) and polypropylene (PP), among others.

Therefore, it is also desired to provide nucleating agents that are applicable across a range of polymers for which crystallization is beneficial.

SUMMARY

In some variations, the present invention provides a polymer composition comprising from about 50 wt % to about 99.9 wt % polymer, from about 0.1 wt % to about 10 wt % nanocellulose as a first nucleating agent, and from about 0.01 wt % to about 5 wt % of a second nucleating agent.

In some embodiments, the invention provides a polylactide composition comprising from about 50 wt % to about 99.9 wt % polylactide, from about 0.1 wt % to about 10 wt % nanocellulose as a first nucleating agent, and from about 0.01 wt % to about 2 wt % of a sulfur-containing, oxygenated aromatic molecule as a second nucleating agent.

The first nucleating agent may be present from about 0.2 wt % to about 5 wt %, for example. The second nucleating agent may be present from about 0.02 wt % to about 1 wt %, for example. In some embodiments, the total concentration of the first nucleating agent and the second nucleating agent is from about 0.2 wt % to about 5 wt %, or from about 0.3 wt % to about 2 wt %. In some embodiments, the ratio of the first nucleating agent to the second nucleating agent is from about 1 to about 10, such as about 1, 2, 3, 4, 5, 6, 7, 8, 9, 10 (or higher).

The sulfur-containing, oxygenated aromatic molecule may be an aromatic sulfonic acid or salt thereof, for example. In certain embodiments, the aromatic sulfonic acid or salt thereof is dimethyl 5-sulfoisophthalate in acid or salt form. In other embodiments, the sulfur-containing, oxygenated aromatic molecule is lignosulfonic acid or a salt thereof.

The nanocellulose may be hydrophobic nanocellulose, such as lignin-containing nanocellulose and/or lignin-coated nanocellulose. The nanocellulose may include sulfonated lignin that is chemically and/or physically bonded to the nanocellulose.

When the polymer is polylactide, the polylactide composition may include a second polymer that is co-polymerized with the polylactide.

The composition may further include one or more additives selected from the group consisting of compatibilizers, plasticizers, fillers, antioxidants, colorants, flame retardants, and combinations thereof. The composition may further include one or more additives selected from the group consisting of glass fibers, mica, talc, metal powder, silica, calcium carbonate, carbon, wollastonite, stearates, clay, metal oxides, carbonates, sulfates, zinc citrate, 1,3,5-benzene tricarboxyamide and its derivatives, carbon nanotubes, carbon black, metal phosphonates ethylene bis-stearamide, starch, cyclodestrin, and combinations thereof The polymer (e.g., polylactide) composition may be in the form of a blend, masterbatch, pellet, extrusion feed, molding feed, extruded part, injection-molded part, blow-molded part, spun fiber, layered sheet, film, foam, container, bag, engineered part, 3D-printing substrate, 3D-printed part, or a combination thereof Other variations provide a polymer composition comprising from about 50 wt % to about 99.9 wt % polymer, from about 0.1 wt % to about 10 wt % lignin-containing nanocellulose as a dispersing agent, and from about 0.01 wt % to about 20 wt % of one or more additives selected from the group consisting of nucleating agents, compatibilizers, plasticizers, fillers, antioxidants, colorants, flame retardants, and combinations thereof.

Other variations provide a polymer nucleating agent comprising from about 50 wt % to about 99 wt % lignin-containing nanocellulose and from about 1 wt % to about 50 wt % of a sulfur-containing, oxygenated aromatic molecule. This may be a nucleating agent for polylactide or for another polymer, such as (but not limited to) polycaprolactone, polyhydroxybutyrate, polyethylene, or polypropylene.

DETAILED DESCRIPTION OF SOME EMBODIMENTS

Figure 1:
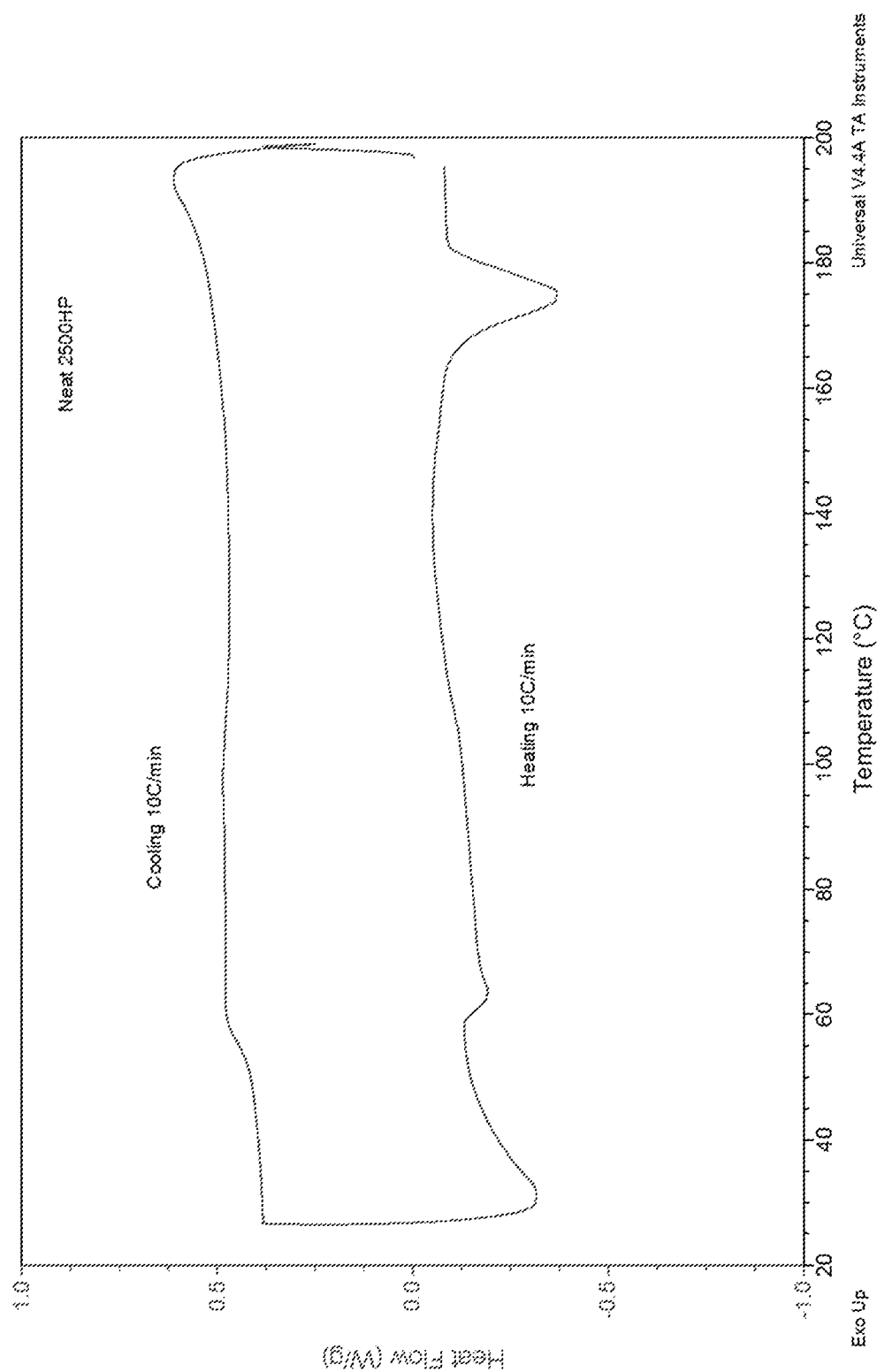
FIG. 1 is a DSC graph of neat 2500HP PLA, in Example 1 herein.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. All composition numbers and ranges based on percentages are weight percentages, unless indicated otherwise. All ranges of numbers or conditions are meant to encompass any specific value contained within the range, rounded to any suitable decimal point.

Unless otherwise indicated, all numbers expressing parameters, reaction conditions, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

This patent application in some variations is predicated on the use of nanocellulose as a nucleating agent for crystallization of polylactide (equivalently herein, "PLA," "polylactic acid," or "poly(lactic acid)").

Lignin-coated cellulose nanocrystals can be dispersed in PLA by high-torque melt mixing, extrusion, or an energy-intensive mixing step, and can act as nucleating agents for the PLA matrix in composites. Without being limited by theory, it is believed that the lignin coating on the nanocellulose helps in both initial dispersion and also avoids re-aggregation of nanocellulose in the polymer matrix. The presence of lignin on the nanocellulose surface may allow PLA chains to fold onto the nanocellulose surface through better compatibility. Improved interaction between lignin and PLA may also allow efficient load transfer between nanocellulose and the polymer matrix.

This patent application is also premised on the surprising results achieved according to the Examples disclosed below.

In summary, in Example 1 (described in detail below), the addition of lignin-coated cellulose nanocrystals to polylactide nucleates cold crystallization upon heating, giving 59% crystallinity vs. 16% crystallinity for the neat polymer (Ingeo® 2500 HP) under the same conditions. In Example 2, lignin-coated cellulose nanocrystals are found to be effective nucleating agents for the crystallization and improvement of rheological and thermo-mechanical properties of PLA. In Example 3, it is shown that lignin-coated cellulose nanocrystals are readily dispersed and distributed in PLA high-torque melt mixing and that this can be scaled up by extrusion. The nanocellulose improves the mechanical performance and processing behavior of the bio-based PLA with the potential of maintaining its biodegradability and biocompatibility. Also, nanocellulose (especially lignin-containing nanocellulose) as a first nucleating agent allows a much lower loading of a second nucleating agent (such as dimethyl 5-sulfoisophthalate salt), decreasing cost.

In some variations, the present invention provides a polymer composition comprising from about 50 wt % to about 99.9 wt % polymer, from about 0.1 wt % to about 10 wt % nanocellulose as a first nucleating agent, and from about 0.01 wt % to about 2 wt % of a sulfur-containing, oxygenated aromatic molecule as a second nucleating agent.

In some embodiments, the invention provides a polylactide composition comprising from about 50 wt % to about 99.9 wt % polylactide, from about 0.1 wt % to about 10 wt % nanocellulose as a first nucleating agent, and from about 0.01 wt % to about 2 wt % of a sulfur-containing, oxygenated aromatic molecule as a second nucleating agent.

The first nucleating agent may be present from about 0.2 wt % to about 5 wt %, for example. The second nucleating agent may be present from about 0.02 wt % to about 1 wt %, for example. In some embodiments, the total concentration of the first nucleating agent and the second nucleating agent is from about 0.2 wt % to about 5 wt %, or from about 0.3 wt % to about 2 wt %. In some embodiments, the ratio of the first nucleating agent to the second nucleating agent is from about 1 to about 20, such as about 1 to about 10, e.g. about 1, 2, 3, 4, 5, 6, 7, 8, 9, or 10. Note that these are weight ratios of the first nucleating agent (nanocellulose) to the second nucleating agent (which is not nanocellulose). A ratio of 1 can also be expressed as 1:1, a ratio of 10 can also be expressed as 10:1 (enriched in nanocellulose compared to the other nucleating agent), and so on.

The sulfur-containing, oxygenated aromatic molecule may be an aromatic sulfonic acid or salt thereof, for example. In certain embodiments, the aromatic sulfonic acid or salt thereof is dimethyl 5-sulfoisophthalate in acid or salt form. In other embodiments, the sulfur-containing, oxygenated aromatic molecule is lignosulfonic acid or a salt thereof.

The nanocellulose may be hydrophobic nanocellulose, such as lignin-containing nanocellulose and/or lignin-coated nanocellulose. The nanocellulose may include sulfonated lignin that is chemically and/or physically bonded to the nanocellulose.

When the polymer is polylactide, the polylactide composition may include a second polymer that is co-polymerized with the polylactide.

The composition may further include one or more additives selected from the group consisting of compatibilizers, plasticizers, fillers, antioxidants, colorants, flame retardants, and combinations thereof. The composition may further include one or more additives selected from the group consisting of glass fibers, mica, talc, metal powder, silica, calcium carbonate, carbon, wollastonite, stearates, clay, metal oxides, carbonates, sulfates, zinc citrate, 1,3,5-benzene tricarboxyamide and its derivatives, carbon nanotubes, carbon black, metal phosphonates ethylene bis-stearamide, starch, cyclodestrin, and combinations thereof The polymer (e.g., polylactide) composition may be in the form of a blend, masterbatch, pellet, extrusion feed, molding feed, extruded part, injection-molded part, blow-molded part, spun fiber, layered sheet, film, foam, container, bag, engineered part, 3D-printing substrate, 3D-printed part, or a combination thereof.

Other variations provide a polymer composition comprising from about 50 wt % to about 99.9 wt % polymer, from about 0.1 wt % to about 10 wt % lignin-containing nanocellulose as a dispersing agent, and from about 0.01 wt % to about 20 wt % of one or more additives selected from the group consisting of nucleating agents, compatibilizers, plasticizers, fillers, antioxidants, colorants, flame retardants, and combinations thereof. The use of nanocellulose as a dispersing agent reduces the amount of second agent needs, thus reducing cost.

Other variations provide a polymer nucleating agent comprising from about 50 wt % to about 99 wt % lignin-containing nanocellulose and from about 1 wt % to about 50 wt % of a sulfur-containing, oxygenated aromatic molecule. This may be a nucleating agent for polylactide or for another polymer, such as (but not limited to) polycaprolactone, polyhydroxybutyrate, polyethylene, or polypropylene.

Examples of nucleating agents that are in addition to nanocellulose as a first nucleating agent (or as a dispersing agent) include, but are not limited to, sulfur-containing, oxygenated aromatic molecules, talc, clay, metal oxides, carbonates, sulfates, zinc citrate, 1,3,5-benzene tricarboxyamide and its derivatives, carbon nanotubes, carbon black, metal phosphonates, ethylene bis-stearamide, starch, cyclodestrin, polyethylene glycol, acetyl-tributyl citrate, tributyl citrate, melamine, alkali metal salts of stearic acid, sodium salts, potassium salts, zinc salts, or a combination thereof. Examples of sulfur-containing, oxygenated aromatic molecules include dimethyl 5-sulfoisophthalate, p-toluene sulfonate, dodecylbenzenesulfonic acid, 3-sulfobenzoic acid, phenylphosphonic acid, dimethyl 5-sulfoisophthalate, or a combination thereof, in acid or salt form.

When large amounts of nucleating agents are present, the nucleating agents may perform a stiffening function, increasing the storage modulus of the molded part at the mold temperature, which can further assist in reducing cycle times.

For the purposes of this invention, the terms polylactide, polylactic acid, and PLA are used interchangeably to denote polymers having at least 50% by weight of polymerized lactic acid repeating units (i.e., those having the structure —OC(O)CH(CH$_3$)—), irrespective of how those repeated units are formed into the polymer. The PLA resin preferably contains at least 80%, at least 90%, or at least 95% by weight of those repeating units.

The PLA resin may further contain repeating units derived from other monomers that are copolymerizable with lactide or lactic acid, such as alkylene oxides (including ethylene oxide, propylene oxide, butylene oxide, tetramethylene oxide, and the like) or cyclic lactones or carbonates. Repeating units derived from these other monomers can be present in block and/or random arrangements.

A preferred PLA resin is a random copolymer of L-lactic acid and D-lactic acid, a block copolymer of L-lactic acid and D-lactic acid, or a mixture thereof. The lactic acid repeating units in the PLA resin may be either all L-enantiomers, all D-enantiomers, or a mixture of L- and D-enantiomers wherein the mixture of L- and D-enantiomers preferably includes at least 97% of one enantiomer, and no more than 3% of the other enantiomer.

The molecular weight of the PLA resin is sufficiently high that the PLA resin is melt-processable. In general, weight-average molecular weights of about 50,000 g/mol or more are suitable, such as 100,000 g/mol, 200,000 g/mol, or more.

Generally it is beneficial to process biomass in a way that effectively separates the major fractions (cellulose, hemicellulose, and lignin) from each other. The cellulose can be subjected to further processing to produce nanocellulose. Fractionation of lignocellulosics leads to release of cellulosic fibers and opens the cell wall structure by dissolution of lignin and hemicellulose between the cellulose microfibrils. The fibers become more accessible for conversion to nanofibrils or nanocrystals. Hemicellulose sugars can be fermented to a variety of products, such as ethanol, or converted to other chemicals. Lignin from biomass has value as a solid fuel and also as an energy feedstock to produce liquid fuels, synthesis gas, or hydrogen; and as an intermediate to make a variety of polymeric compounds. Additionally, minor components such as proteins or rare sugars can be extracted and purified for specialty applications.

This disclosure describes processes and apparatus to efficiently fractionate any lignocellulosic-based biomass into its primary major components (cellulose, lignin, and if present, hemicellulose) so that each can be used in potentially distinct processes. An advantage of the process is that it produces cellulose-rich solids while concurrently producing a liquid phase containing a high yield of both hemicellulose sugars and lignin, and low quantities of lignin and hemicellulose degradation products. The flexible fractionation technique enables multiple uses for the products. The cellulose is an advantaged precursor for producing nanocellulose, as will be described herein.

A significant techno-economic barrier for production of cellulose nanofibrils (CNF) is high energy consumption and high cost. Using sulfur dioxide (SO$_2$) and ethanol (or other solvent), the pretreatment disclosed herein effectively removes not only hemicelluloses and lignin from biomass but also the amorphous regions of cellulose, giving a unique, highly crystalline cellulose product that requires minimal mechanical energy for conversion to CNF. The low mechanical energy requirement results from the fibrillated cellulose network formed during chemical pretreatment upon removal of the amorphous regions of cellulose.

Cellulose nanofibrils (CNF) and cellulose nanocrystals (CNC) are commonly isolated from pulp by a combination of mechanical and chemical processes. The sulfuric acid treatment used in these processes both causes an increase in the cost of the process and resulted in products with low temperature resistivity. According to the processes disclosed herein, CNFs and CNCs may be generated without the reactive sulfate groups on their surface resulting in enhanced temperature resistivity and higher degradation temperatures (~300° C. vs. ~200° C. with conventional processes). Therefore, this process can produce nanocellulose fibrils and crystals which can be incorporated into high-temperature polymers and processed at elevated temperatures. For polymers with processing temperatures above 200° C., this process opens up a new window of opportunities for use of nanocellulose-reinforced polymers. Also, the ability to produce lignin-coated (i.e., hydrophobic surface) nanocellulose fibrils and crystals will promote the dispersion of nanocellulose in many polymer precursors which are hydrophobic in nature. With careful control of the processing parameters and formulations used, the technology can be optimized for printing parts.

As intended herein, "nanocellulose" is broadly defined to include a range of cellulosic materials, including but not limited to microfibrillated cellulose, nanofibrillated cellulose, microcrystalline cellulose, nanocrystalline cellulose, and particulated or fibrillated dissolving pulp. Typically, nanocellulose as provided herein will include particles having at least one length dimension (e.g., diameter) on the nanometer scale.

"Nanofibrillated cellulose" or equivalently "cellulose nanofibrils" means cellulose fibers or regions that contain nanometer-sized particles or fibers, or both micron-sized and nanometer-sized particles or fibers. "Nanocrystalline cellulose" or equivalently "cellulose nanocrystals" means cellulose particles, regions, or crystals that contain nanometer-sized domains, or both micron-sized and nanometer-sized domains. "Micron-sized" includes from 1 µm to 100 µm and "nanometer-sized" includes from 0.01 nm to 1000 nm (1 µm). Larger domains (including long fibers) may also be present in these materials.

The nanocellulose nucleating agent itself is preferably highly crystalline. According to the methods disclosed herein, high crystallinity can be produced and maintained during formation of nanofibers or nanocrystals, without the need for an enzymatic or separate acid treatment step to hydrolyze amorphous cellulose. High crystallinity can translate to mechanically strong fibers or good physical reinforcing properties, which are advantageous for composites, reinforced polymers, and high-strength spun fibers and textiles, for example.

In some variations, the invention provides a polymer-nanocellulose-lignin composite comprising a hydrophobic polymer, about 0.05 wt % to about 50 wt % nanocellulose, and about 0.01 wt % to about 20 wt % lignin, wherein at least a portion of the lignin forms an interface between the hydrophobic polymer and the nanocellulose.

In some variations, the invention provides a polymer-nanocellulose-lignin composite comprising a hydrophobic polymer, about 0.01 wt % to about 20 wt % nanocellulose, and about 0.001 wt % to about 5 wt % lignin, wherein at least a portion of the lignin forms an interface between the hydrophobic polymer and the nanocellulose.

In some variations, the invention provides a polymer-nanocellulose-lignin composite comprising a hydrophobic polymer, about 0.01 wt % to more nanocellulose, and lignin, wherein at least a portion of the lignin forms an interface between the hydrophobic polymer and the nanocellulose.

In some embodiments, the composite comprises about 0.1 wt % to about 5 wt % nanocellulose or about 5 wt % to about 20 wt % nanocellulose. In some embodiments, the composite comprises about 0.1 wt % to about 10 wt % lignin. The lignin in the composite may include lignin that is chemically bonded to the nanocellulose and/or lignin that is physically deposited on the nanocellulose. The lignin may include sulfonated lignin. For example, the lignin sulfur content may be about 0.1 wt % to about 10 wt % of total lignin present in the composite (i.e., lignin basis).

The nanocellulose in the composite may include lignin-coated cellulose nanofibrils, lignin-coated cellulose nanocrystals, or a blend of lignin-coated cellulose nanofibrils and lignin-coated cellulose nanocrystals. In some embodiments, at least a portion of the nanocellulose is fully encapsulated with lignin.

In some embodiments, the polymer and at least a portion of the lignin are physically entangled at the interface. At the interface in some composites, the lignin that is physically entangled is chemically bonded lignin with the nanocellulose. In these or other composites, at the interface, the lignin that is physically entangled is physically deposited lignin on the nanocellulose. In certain composites, at the interface, the lignin that is physically entangled is a mixture of chemically bonded and physically deposited lignin on the nanocellulose.

The polymer-nanocellulose-lignin composite includes at least one nucleating agent, which may be the nanocellulose and/or a second nucleating agent, as described above. In some embodiments, the polymer-nanocellulose-lignin composite further comprises one or more additives selected from the group consisting of compatibilizers, plasticizers, fillers, antioxidants, colorants, flame retardants, and combinations thereof, in various embodiments. The composite may include one or more additives selected from the group consisting of carbon black, carbon nanotubes, carbon fibers, graphene, glass fibers, mica, talc, nickel powder, silica, calcium carbonate, wollastonite, stearates, and combinations thereof.

The composite may be in the form of a blend, masterbatch, pellet, extrusion feed, molding feed, extruded part, injection-molded part, blow-molded part, spun fiber, layered sheet, film, foam, container, bag, engineered part, 3D-printing substrate, 3D-printed part, or a combination thereof.

In some polymer-nanocellulose-lignin composites provided herein, the composite has higher tensile modulus compared to the polymer alone. For example, the composite may be characterized by at least an order of magnitude higher tensile modulus compared to the polymer.

In some polymer-nanocellulose-lignin composites provided herein, the composite has higher $T_g$ than the polymer alone.

Some embodiments utilize a process for producing a nanocellulose-polymer composite material, the process comprising:

(a) providing a lignocellulosic biomass feedstock;

(b) fractionating the feedstock in the presence of an acid, a solvent for lignin, and water, to generate cellulose-rich solids and a liquid containing hemicellulose and lignin, wherein at least a portion of the lignin deposits onto a surface of, or within fiber pores of, the cellulose-rich solids, thereby rendering the cellulose-rich solids at least partially hydrophobic;

(c) mechanically treating the cellulose-rich solids to form a hydrophobic lignin-coated nanocellulose material comprising cellulose fibrils and/or cellulose crystals;

(d) hydrolyzing the hemicellulose to generate fermentable hemicellulosic sugars;

(e) fermenting the fermentable hemicellulosic sugars with a suitable microorganism to generate a monomer or monomer precursor;

(f) polymerizing the monomer or a derivative of the monomer precursor to produce a polymer; and (g) combining the polymer with the lignin-coated nanocellulose to generate a polymer-nanocellulose-lignin composite material.

The acid may be selected from the group consisting of organic acids, inorganic acids, ionic liquid acid functional groups, and combinations thereof. In certain preferred embodiments, the acid is selected from the group consisting of sulfur dioxide, sulfurous acid, sulfuric acid, lignosulfonic acid, and combinations thereof. The solvent may be selected from the group consisting of alkanes, olefins, aromatics, alcohols, diols, organic acids, organic acid esters, ketones, aldehydes, and combinations thereof In some embodiments, the liquid from step (b) further contains glucose, which is optionally fermented to an additional amount of the monomer or monomer precursor.

The monomer may be an organic acid (such as lactic acid) or a derivative thereof (such as lactide). When step (e) generates a monomer precursor, it may be ethanol, for example, which in converted to olefins (e.g., ethylene) for producing a polymer (e.g., polyethylene) in step (f), prior to combining with the lignin-coated nanocellulose to generate a polymer-nanocellulose-lignin composite material The disclosed processes may produce a polymer-nanocellulose-lignin-nucleating agent composite material that is substantially or even entirely derived from biomass. In some embodiments of the invention, a polymer-nanocellulose-lignin-nucleating agent composite material has 100% renewable carbon content.

Various industrial and consumer products may be fabricated from the polymer-nanocellulose-lignin-nucleating agent composite material. These include any known products containing polymers, as well as new products (such as engineered composites).

Polymers that may be included in the polymer-nanocellulose-lignin-nucleating agent composite material may be hydrophobic, partially hydrophobic, or oleophilic, for example. Hydrophilic polymers may be modified to render them at least partially hydrophobic, with suitable coatings or combinations of components (e.g., interpenetrating networks of polymers).

Polymers herein may be selected from polyesters, polyolefins, polyamides, polyurethanes, polyureas, poly(amide-enamine)s, polyanhydrides, polyacrylates, polyhydroxyalkanoates, poly(alkene dicarboxylate)s, silicones, and combinations or copolymers (e.g., aliphatic-aromatic copolyesters) thereof.

In various embodiments, a polymer is selected from the group consisting of polyethylene, polypropylene, polybutene, polyisobutylene, polybutadiene, polyisoprene, poly(ethylene-co-acrylic acid), poly(lactic acid) (or polylactide), poly(glycolic acid) (or polyglycolide), poly(hydroxybutyrate), poly(butylene adipate-co-terephtalate), poly(butylene succinate), poly(hydroxybutyrate-co-hydroxyvalerate), poly(ethylene terephthalate), polyvinyl alcohol, polystyrene, poly(butyl acrylate), poly(tert-butyl acrylate-co-ethyl acrylate-co-methacrylic acid), poly(ethyl acrylate), poly(2-ethylhexyl acrylate), poly(methyl acrylate), polyacrylonitrile, poly(acrylonitrile-co-methyl acrylate), poly(styrene-co-maleic anhydride), poly(methyl methacrylate), poly(alkyl methacrylate), polyvinylcyclohexane, poly(Bisphenol A carbonate), poly(propylene carbonate), poly(1,4-butylene adipate), poly(1,4-butylene succinate), poly(1,4-butylene terephthalate), poly(ethylene succinate), poly(vinyl acetate), poly(propylene glycol), poly(tetrahydrofuran), poly(ethyl vinyl ether), polydimethylsiloxane, nylons (aliphatic polyamides), and combinations or copolymers thereof. Carbonaceous polymers may also be incorporated in the composites. Examples of carbonaceous polymers include polyacenaphthylene, graphite, graphene, and carbon fibers.

In some embodiments, the polymer is or includes a biodegradable polymer, such as any polymer described in Vroman and Tighzert, "Biodegradable Polymers," *Materials* 2009, 2, 307-344, which is hereby incorporated by reference herein.

Polymers or copolymers may be produced by polymerizing one or more monomers selected from the group consisting of acrylics, amides, carbon, carbonates, dienes, esters, ethers, fluorocarbons, imides, olefins, organic acids (e.g., lactic acid, glycolic acid, succinic acid, hydroxypropionic acid, etc.), styrenes, siloxanes, vinyl acetals, vinyl and vinylidene chlorides, vinyl esters, vinyl ethers, vinyl ketones, vinylpyridine, vinypyrrolidone, and combinations thereof.

Polylactide is an exemplary polymer for the purposes of this disclosure and detailed description, but the invention is expressly not limited in any way to polylactide.

In some variations, the invention provides a polylactide-nanocellulose-lignin composite comprising polylactide, about 0.05 wt % to about 30 wt % nanocellulose, and about 2 wt % to about 20 wt % lignin, wherein at least a portion of the lignin forms a hydrophobic interface between the polylactide and the nanocellulose. In some embodiments, the composite comprises about 0.1 wt % to about 5 wt % nanocellulose. In other embodiments, the composite comprises about 5 wt % to about 20 wt % nanocellulose.

In some embodiments, the composite comprises about 3 wt % to about 10 wt % lignin. The lignin may be chemically bonded to the nanocellulose and/or physically deposited on the nanocellulose. In some embodiments, the lignin includes sulfonated lignin. For example, the sulfur content may be about 0.1 wt % to about 10 wt % of total lignin present in the composite.

In some polylactide-nanocellulose-lignin composites, the nanocellulose comprises lignin-coated cellulose nanofibrils. In these or other polylactide-nanocellulose-lignin composites, the nanocellulose comprises lignin-coated cellulose nanocrystals. In some embodiments, the nanocellulose comprises a blend of lignin-coated cellulose nanofibrils and lignin-coated cellulose nanocrystals. In certain embodiments, at least a portion of the nanocellulose is lignin-encapsulated nanocellulose. In any of these embodiments, some of the lignin may be lignin that does not coat, chemically bond with, or physically attach to nanocellulose (i.e. there can be bulk, dispersed lignin particles present).

In some embodiments, the polylactide and at least a portion of the lignin are physically entangled at the interface. At the interface, the lignin that is physically entangled may be chemically bonded lignin and/or physically deposited lignin on/with the nanocellulose. In certain embodiments, at the interface, the lignin that is physically entangled is a mixture of chemically bonded and physically deposited lignin on the nanocellulose.

In various embodiments, the polylactide-nanocellulose-lignin composite further comprises one or more additives selected from the group consisting of compatibilizers, plasticizers, fillers, antioxidants, colorants, flame retardants, and combinations thereof. For example, the composite may contain one or more additives selected from the group consisting of carbon black, carbon nanotubes, carbon fibers, graphene, glass fibers, mica, talc, nickel powder, silica, calcium carbonate, wollastonite, stearates, and combinations thereof.

Jacobsen et al., "Plasticizing polylactide—the effect of different plasticizers on the mechanical properties," *Polymer Engineering & Science,* Volume 39, Issue 7, pages 1303-1310, Jul. 1999, is hereby incorporated by reference herein for its teachings of various plasticizers that may be incorporated in compositions or composites herein.

In various embodiments, the polylactide-nanocellulose-lignin composite is in the form of a blend, masterbatch, pellet, extrusion feed, molding feed, extruded part, injection-molded part, blow-molded part, spun fiber, layered sheet, film, foam, container, bag, engineered part, 3D-printing substrate, 3D-printed part, or a combination thereof.

The presence of lignin in the composite, at the interface between polylactide and nanocellulose, enables a well-dispersed material with improved properties (including strength and barrier properties), compared to a polylactide-nanocellulose composite (without any lignin) or compared to polylactide alone.

The polylactide-nanocellulose-lignin-nucleating agent composite provided in some embodiments has higher tensile modulus compared to polylactide—such as about 1, 2, 3, 4 or more orders of magnitude higher in tensile modulus compared to polylactide alone.

The polylactide-nanocellulose-lignin-nucleating agent composite provided in some embodiments has lower vapor (e.g., oxygen, $CO_2$, or water vapor) permeability compared to polylactide.

The polylactide-nanocellulose-lignin-nucleating agent composite provided in some embodiments has better heat stability (such as heat-distortion temperature) compared to polylactide.

The invention, in some variations, utilizes a process for producing a nanocellulose-polylactide-nucleating agent composite material, the process comprising:
(a) providing a lignocellulosic biomass feedstock;
(b) fractionating the feedstock in the presence of an acid, a solvent for lignin, and water, to generate cellulose-rich solids and a liquid containing hemicellulose and lignin, wherein at least a portion of the lignin deposits onto a surface of, or within fiber pores of, the cellulose-rich solids, thereby rendering the cellulose-rich solids at least partially hydrophobic;
(c) mechanically treating the cellulose-rich solids to form a hydrophobic lignin-coated nanocellulose material comprising cellulose fibrils and/or cellulose crystals;
(d) hydrolyzing the hemicellulose to generate fermentable hemicellulosic sugars;
(e) fermenting the fermentable hemicellulosic sugars with a suitable lactic acid microorganism to generate lactic acid;
(f) polymerizing the lactic acid, or an oligomer or lactide thereof, to polylactide; and
(g) combining the polylactide with the lignin-coated nanocellulose and a nucleating agent to generate a polylactide-nanocellulose-lignin-nucleating agent composite material.

The acid may be selected from the group consisting of organic acids, inorganic acids, ionic liquid acid functional groups, and combinations thereof. For example, the acid may be selected from the group consisting of sulfur dioxide, sulfurous acid, sulfuric acid, lignosulfonic acid, and combinations thereof.

The solvent may be selected from the group consisting of alkanes, olefins, aromatics, alcohols, diols, organic acids, organic acid esters, ketones, aldehydes, and combinations thereof.

In some embodiments, the liquid from step (b) further contains glucose, which may be fermented to additional lactic acid. Such lactic acid may include L-lactic acid, D-lactic acid, or a combination of L-lactic acid and D-lactic acid, which when polymerized (typically via lactide) will produce polylactide comprising L-polylactide, D-polylactide, meso-polylactide, L,D-polylactide, or combinations thereof.

The disclosed processes may produce a polylactide-nanocellulose-lignin-nucleating agent composite material that is substantially or even entirely derived from biomass. In some embodiments of the invention, a polylactide-nanocellulose-lignin-nucleating agent composite material has 100% renewable carbon content.

Various industrial and consumer products may be fabricated from the polylactide-nanocellulose-lignin composite material. These include any known products containing polylactide (see e.g. www.natureworksllc.com/Product-and-Applications), as well as new products (such as engineered composites).

Some variations are premised on the realization that all components of hydrophobic nanocellulose-polylactide composite materials may be produced from a single biomass source. The main components of biomass are cellulose, hemicellulose, and lignin. The cellulose can be converted to nanocellulose using the processes described in detail herein. The lignin can be deposited onto the nanocellulose to increase its hydrophobicity. Finally, the hemicelluloses can be converted to monomer sugars and then fermented to lactic acid, using known organisms, followed by polymerization of lactic acid (such as via lactide) to polylactide. The polylactide may then be formed into a nanocellulose-polylactide composite.

In some variations, the present invention utilizes a process for producing a nanocellulose-polylactide-nucleating agent composite material, the process comprising:
(a) providing a lignocellulosic biomass feedstock;
(b) fractionating the feedstock in the presence of an acid, a solvent for lignin, and water, to generate cellulose-rich solids and a liquid containing hemicellulose and lignin, wherein at least a portion of the lignin deposits onto a surface of the cellulose-rich solids, thereby rendering the cellulose-rich solids at least partially hydrophobic;
(c) mechanically treating the cellulose-rich solids to form a hydrophobic nanocellulose material comprising cellulose fibrils and/or cellulose crystals;
(d) hydrolyzing the hemicellulose to generate fermentable hemicellulosic sugars;
(e) fermenting the fermentable hemicellulosic sugars with a suitable lactic acid microorganism to generate lactic acid;
(f) polymerizing the lactic acid, or an oligomer or lactide thereof, to polylactide; and
(g) combining the polylactide with the nanocellulose and one or more nucleating agents to generate a nanocellulose-polylactide-nucleating agent composite material.

In some embodiments, the acid is selected from the group consisting of organic acids, inorganic acids, ionic liquid acid functional groups, and combinations thereof. For example, the acid may be selected from the group consisting of sulfur dioxide, sulfurous acid, sulfuric acid, lignosulfonic acid, and combinations thereof.

In some embodiments, the solvent is selected from the group consisting of alkanes, olefins, aromatics, alcohols, diols, organic acids, organic acid esters, ketones, aldehydes, and combinations thereof.

The lactic acid produced may be L-lactic acid, D-lactic acid, or a combination of L-lactic acid and D-lactic acid. In some embodiments, the liquid from step (b) further contains glucose, which is optionally fermented to additional lactic acid (which may be L and/or D isomers). Fermentation of hemicellulose sugars, including (but not limited to) glucose and xylose, is known in the art using genetically modified yeasts or bacteria.

The polylactide may include L-polylactide, D-polylactide, meso-polylactide, L,D-polylactide, or combinations thereof. Polymerization of lactic acid, lactic acid oligomers, or lactide (a cyclic dimer of lactic acid) is well-known in the industry (see, for example, www.natureworksllc.com/Technical-Resources).

The nanocellulose-polylactide composite material is preferably entirely derived from biomass. The nanocellulose-polylactide composite material comprises 100% renewable carbon content, in some embodiments.

Certain embodiments provide a multilayered nanocellulose-lignin-polylactide composite material comprising a lignin layer disposed on a nanocellulose layer, and a polylactide layer disposed on the lignin layer.

In some embodiments, a product comprising the nanocellulose-polylactide composite material is provided. Many types of products are possible, including films, coatings, packaging, utensils, fibers, fabrics, apparel, durable goods, nonwovens, and so on.

In some variations, a process for producing a nanocellulose material comprises:

(a) providing a lignocellulosic biomass feedstock;

(b) fractionating the feedstock in the presence of an acid, a solvent for lignin, and water, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity (i.e., cellulose crystallinity) of at least 60%; and (d) recovering the nanocellulose material.

In some embodiments, the acid is selected from the group consisting of sulfur dioxide, sulfurous acid, sulfur trioxide, sulfuric acid, lignosulfonic acid, and combinations thereof. In particular embodiments, the acid is sulfur dioxide.

The biomass feedstock may be selected from hardwoods, softwoods, forest residues, eucalyptus, industrial wastes, pulp and paper wastes, consumer wastes, or combinations thereof. Some embodiments utilize agricultural residues, which include lignocellulosic biomass associated with food crops, annual grasses, energy crops, or other annually renewable feedstocks. Exemplary agricultural residues include, but are not limited to, corn stover, corn fiber, wheat straw, sugarcane bagasse, sugarcane straw, rice straw, oat straw, barley straw, miscanthus, energy cane straw/residue, or combinations thereof. The process disclosed herein benefits from feedstock flexibility; it is effective for a wide variety of cellulose-containing feedstocks.

As used herein, "lignocellulosic biomass" means any material containing cellulose and lignin. Lignocellulosic biomass may also contain hemicellulose. Mixtures of one or more types of biomass can be used. In some embodiments, the biomass feedstock comprises both a lignocellulosic component (such as one described above) in addition to a sucrose-containing component (e.g., sugarcane or energy cane) and/or a starch component (e.g., corn, wheat, rice, etc.). Various moisture levels may be associated with the starting biomass. The biomass feedstock need not be, but may be, relatively dry. In general, the biomass is in the form of a particulate or chip, but particle size is not critical in this invention.

In some embodiments, during step (c), the cellulose-rich solids are treated with a total mechanical energy of less than about 5000 kilowatt-hours per ton of the cellulose-rich solids, such as less than about 4000, 3000, 2000, or 1000 kilowatt-hours per ton of the cellulose-rich solids. Energy consumption may be measured in any other suitable units. An ammeter measuring current drawn by a motor driving the mechanical treatment device is one way to obtain an estimate of the total mechanical energy.

Mechanically treating in step (c) may employ one or more known techniques such as, but by no means limited to, milling, grinding, beating, sonicating, or any other means to form or release nanofibrils and/or nanocrystals in the cellulose. Essentially, any type of mill or device that physically separates fibers may be utilized. Such mills are well-known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. See, for example, Smook, *Handbook for Pulp & Paper Technologists,* Tappi Press, 1992; and Hubbe et al., "Cellulose Nanocomposites: A Review," *BioResources* 3(3), 929-980 (2008).

The extent of mechanical treatment may be monitored during the process by any of several means. Certain optical instruments can provide continuous data relating to the fiber length distributions and % fines, either of which may be used to define endpoints for the mechanical treatment step. The time, temperature, and pressure may vary during mechanical treatment. For example, in some embodiments, sonication for a time from about 5 minutes to 2 hours, at ambient temperature and pressure, may be utilized.

In some embodiments, a portion of the cellulose-rich solids is converted to nanofibrils while the remainder of the cellulose-rich solids is not fibrillated. In various embodiments, about 10%, 20%, 30%, 40%, 50%, 60%, 70%, 80%, 90%, 95%, 99%, or substantially all of the cellulose-rich solids are fibrillated into nanofibrils.

In some embodiments, a portion of the nanofibrils is converted to nanocrystals while the remainder of the nanofibrils is not converted to nanocrystals. In various embodiments, about 10%, 20%, 30%, 40%, 50%, 60%, 70%, 80%, 90%, 95%, 99%, or substantially all of the nanofibrils are converted to nanocrystals. During drying, it is possible for a small amount of nanocrystals to come back together and form nanofibrils.

Following mechanical treatment, the nanocellulose material may be classified by particle size. A portion of material may be subjected to a separate process, such as enzymatic hydrolysis to produce glucose. Such material may have good crystallinity, for example, but may not have desirable particle size or degree of polymerization.

Step (c) may further comprise treatment of the cellulose-rich solids with one or more enzymes or with one or more acids. When acids are employed, they may be selected from the group consisting of sulfur dioxide, sulfurous acid, lignosulfonic acid, acetic acid, formic acid, and combinations thereof. Acids associated with hemicellulose, such as acetic acid or uronic acids, may be employed, alone or in conjunction with other acids. Also, step (c) may include treatment of the cellulose-rich solids with heat. In some embodiments, step (c) does not employ any enzymes or acids.

In step (c), when an acid is employed, the acid may be a strong acid such as sulfuric acid, nitric acid, or phosphoric acid, for example. Weaker acids may be employed, under more severe temperature and/or time. Enzymes that hydrolyze cellulose (i.e., cellulases) and possibly hemicellulose (i.e., with hemicellulase activity) may be employed in step (c), either instead of acids, or potentially in a sequential configuration before or after acidic hydrolysis.

In some embodiments, the process comprises enzymatically treating the cellulose-rich solids to hydrolyze amorphous cellulose. In other embodiments, or sequentially prior to or after enzymatic treatment, the process may comprise acid-treating the cellulose-rich solids to hydrolyze amorphous cellulose.

In some embodiments, the process further comprises enzymatically treating the nanocrystalline cellulose. In other embodiments, or sequentially prior to or after enzymatic treatment, the process further comprises acid-treating treating the nanocrystalline cellulose.

If desired, an enzymatic treatment may be employed prior to, or possibly simultaneously with, the mechanical treatment. However, in preferred embodiments, no enzyme treatment is necessary to hydrolyze amorphous cellulose or weaken the structure of the fiber walls before isolation of nanofibers.

Following mechanical treatment, the nanocellulose may be recovered. Separation of cellulose nanofibrils and/or nanocrystals may be accomplished using apparatus capable of disintegrating the ultrastructure of the cell wall while preserving the integrity of the nanofibrils. For example, a homogenizer may be employed. In some embodiments, cellulose aggregate fibrils are recovered, having component fibrils in range of 1-100 nm width, wherein the fibrils have not been completely separated from each other.

The process may further comprise bleaching the cellulose-rich solids prior to step (c) and/or as part of step (c). Alternatively, or additionally, the process may further comprise bleaching the nanocellulose material during step (c) and/or following step (c). Any known bleaching technology or sequence may be employed, including enzymatic bleaching.

The nanocellulose material may include, or consist essentially of, nanofibrillated cellulose. The nanocellulose material may include, or consist essentially of, nanocrystalline cellulose. In some embodiments, the nanocellulose material may include, or consist essentially of, nanofibrillated cellulose and nanocrystalline cellulose.

In some embodiments, the crystallinity of the cellulose-rich solids (i.e., the nanocellulose precursor material) is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. In these or other embodiments, the crystallinity of the nanocellulose material is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. The crystallinity may be measured using any known techniques. For example, X-ray diffraction and solid-state $^{13}C$ nuclear magnetic resonance may be utilized.

It is remarkable that the nanocellulose precursor material has high crystallinity—which generally contributes to mechanical strength—yet, very low mechanical energy consumption is necessary to break apart the nanocellulose precursor material into nanofibrils and nanocrystals. It is believed that since the mechanical energy input is low, the high crystallinity is essentially maintained in the final product.

In some embodiments, the nanocellulose material is characterized by an average degree of polymerization from about 100 to about 1500, such as about 125, 150, 175, 200, 225, 250, 300, 400, 500, 600, 700, 800, 900, 1000, 1100, 1200, 1300, or 1400. For example, the nanocellulose material may be characterized by an average degree of polymerization from about 300 to about 700, or from about 150 to about 250. The nanocellulose material, when in the form of nanocrystals, may have a degree of polymerization less than 100, such as about 75, 50, 25, or 10. Portions of the material may have a degree of polymerization that is higher than 1500, such as about 2000, 3000, 4000, or 5000.

In some embodiments, the nanocellulose material is characterized by a degree of polymerization distribution having a single peak. In other embodiments, the nanocellulose material is characterized by a degree of polymerization distribution having two peaks, such as one centered in the range of 150-250 and another peak centered in the range of 300-700.

In some embodiments, the nanocellulose material is characterized by an average length-to-width aspect ratio of particles from about 10 to about 1000, such as about 15, 20, 25, 35, 50, 75, 100, 150, 200, 250, 300, 400, or 500. Nanofibrils are generally associated with higher aspect ratios than nanocrystals. Nanocrystals, for example, may have a length range of about 100 nm to 500 nm and a diameter of about 4 nm, translating to an aspect ratio of 25 to 125. Nanofibrils may have a length of about 2000 nm and diameter range of 5 to 50 nm, translating to an aspect ratio of 40 to 400. In some embodiments, the aspect ratio is less than 50, less than 45, less than 40, less than 35, less than 30, less than 25, less than 20, less than 15, or less than 10.

Optionally, the process further comprises hydrolyzing amorphous cellulose into glucose in step (b) and/or step (c), recovering the glucose, and fermenting the glucose to a fermentation product. Optionally, the process further comprises recovering, fermenting, or further treating hemicellulosic sugars derived from the hemicellulose. Optionally, the process further comprises recovering, combusting, or further treating the lignin.

Glucose that is generated from hydrolysis of amorphous cellulose may be integrated into an overall process to produce ethanol, or another fermentation co-product. Thus in some embodiments, the process further comprises hydrolyzing amorphous cellulose into glucose in step (b) and/or step (c), and recovering the glucose. The glucose may be purified and sold. Or the glucose may be fermented to a fermentation product, such as but not limited to ethanol. The glucose or a fermentation product may be recycled to the front end, such as to hemicellulose sugar processing, if desired.

When hemicellulosic sugars are recovered and fermented, they may be fermented to produce a monomer or precursor thereof. The monomer may be polymerized to produce a polymer, which may then be combined with the nanocellulose material to form a polymer-nanocellulose composite.

In some embodiments, the nanocellulose material is at least partially hydrophobic via deposition of at least some of the lignin onto a surface of the cellulose-rich solids during step (b). In these or other embodiments, the nanocellulose material is at least partially hydrophobic via deposition of at least some of the lignin onto a surface of the nanocellulose material during step (c) or step (d).

In some embodiments, the process further comprises chemically converting the nanocellulose material to one or more nanocellulose derivatives. For example, nanocellulose derivatives may be selected from the group consisting of nanocellulose esters, nanocellulose ethers, nanocellulose ether esters, alkylated nanocellulose compounds, cross-linked nanocellulose compounds, acid-functionalized nanocellulose compounds, base-functionalized nanocellulose compounds, and combinations thereof.

Various types of nanocellulose functionalization or derivatization may be employed, such as functionalization using polymers, chemical surface modification, functionalization using nanoparticles (i.e. other nanoparticles besides the nanocellulose), modification with inorganics or surfactants, or biochemical modification.

Certain variations utilize a process for producing a nanocellulose material, the process comprising:

(a) providing a lignocellulosic biomass feedstock;

(b) fractionating the feedstock in the presence of sulfur dioxide, a solvent for lignin, and water, to generate cellulose-rich solids and a liquid containing hemicellulose oligomers and lignin, wherein the crystallinity of the cellulose-rich solids is at least 70%, wherein $SO_2$ concentration is from about 10 wt % to about 50 wt %, fractionation temperature is from about 130° C. to about 200° C., and fractionation time is from about 30 minutes to about 4 hours;

(c) mechanically treating the cellulose-rich solids to form cellulose fibrils and/or cellulose crystals, thereby generating a nanocellulose material having a crystallinity of at least 70%; and (d) recovering the nanocellulose material.

In some embodiments, the $SO_2$ concentration is from about 12 wt % to about 30 wt %. In some embodiments, the fractionation temperature is from about 140° C. to about 170° C. In some embodiments, the fractionation time is from about 1 hour to about 2 hours. The process may be controlled such that during step (b), a portion of the solubilized lignin intentionally deposits back onto a surface of the cellulose-rich solids, thereby rendering the cellulose-rich solids at least partially hydrophobic.

A significant factor limiting the application of strength-enhancing, lightweight nanocellulose in composites is cellulose's inherent hydrophilicity. Surface modification of the nanocellulose surface to impart hydrophobicity to enable uniform dispersion in a hydrophobic polymer matrix is an active area of study. It has been discovered that when preparing nanocellulose using the processes described herein, lignin may condense on pulp under certain conditions, giving a rise in Kappa number and production of a brown or black material. The lignin increases the hydrophobicity of the nanocellulose precursor material, and that hydrophobicity is retained during mechanical treatment provided that there is not removal of the lignin through bleaching or other steps. (Some bleaching may still be performed, either to adjust lignin content or to attack a certain type of lignin, for example.)

In some embodiments, the present invention utilizes a process for producing a hydrophobic nanocellulose material, the process comprising:

(a) providing a lignocellulosic biomass feedstock;

(b) fractionating the feedstock in the presence of an acid, a solvent for lignin, and water, to generate cellulose-rich solids and a liquid containing hemicellulose and lignin, wherein a portion of the lignin onto the cellulose-rich solids, thereby rendering the cellulose-rich solids at least partially hydrophobic;

(c) mechanically treating the cellulose-rich solids to form cellulose fibrils and/or cellulose crystals, thereby generating a hydrophobic nanocellulose material having a crystallinity of at least 60%; and (d) recovering the hydrophobic, lignin-containing nanocellulose material.

The crystallinity of the nanocellulose material is at least 70% or at least 80%, in various embodiments. The nanocellulose material may include nanofibrillated cellulose, nanocrystalline cellulose, or both nanofibrillated and nanocrystalline cellulose. The nanocellulose material may be characterized by an average degree of polymerization from about 100 to about 1500, such as from about 300 to about 700, or from about 150 to about 250, for example (without limitation).

Step (b) may include process conditions, such as extended time and/or temperature, or reduced concentration of solvent for lignin, which tend to promote lignin deposition onto fibers. Alternatively, or additionally, step (b) may include one or more washing steps that are adapted to deposit at least some of the lignin that was solubilized during the initial fractionation. One approach is to wash with water rather than a solution of water and solvent. Because lignin is generally not soluble in water, it will begin to precipitate. Optionally, other conditions may be varied, such as pH and temperature, during fractionation, washing, or other steps, to optimize the amount of lignin deposited on surfaces. It is noted that in order for the lignin surface concentration to be higher than the bulk concentration, the lignin needs to be first pulled into solution and then redeposited; internal lignin (within particles of nanocellulose) does not enhance hydrophobicity in the same way.

Optionally, the process for producing a hydrophobic nanocellulose material may further include chemically modifying the lignin to increase hydrophobicity of the nanocellulose material. The chemical modification of lignin may be conducted during step (b), step (c), step (d), following step (d), or some combination.

High loading rates of lignin have been achieved in thermoplastics. Even higher loading levels are obtained with well-known modifications of lignin. The preparation of useful polymeric materials containing a substantial amount of lignin has been the subject of investigations for more than thirty years. Typically, lignin may be blended into polyolefins or polyesters by extrusion up to 25-40 wt % while satisfying mechanical characteristics. In order to increase the compatibility between lignin and other hydrophobic polymers, different approaches have been used. For example, chemical modification of lignin may be accomplished through esterification with long-chain fatty acids.

Any known chemical modifications may be carried out on the lignin, to further increase the hydrophobic nature of the lignin-coated nanocellulose material provided by embodiments of this invention.

The present invention utilizes, in some variations, a process for producing a nanocellulose-containing product, the process comprising:

(a) providing a lignocellulosic biomass feedstock;

(b) fractionating the feedstock in the presence of an acid, a solvent for lignin, and water, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity of at least 60%; and (d) incorporating at least a portion of the nanocellulose material into a nanocellulose-containing product.

The nanocellulose-containing product includes the nanocellulose material, or a treated form thereof In some embodiments, the nanocellulose-containing product consists essentially of the nanocellulose material.

In some embodiments, step (d) comprises forming a structural object that includes the nanocellulose material, or a derivative thereof.

In some embodiments, step (d) comprises forming a foam or aerogel that includes the nanocellulose material, or a derivative thereof.

In some embodiments, step (d) comprises combining the nanocellulose material, or a derivative thereof, with one or more other materials to form a composite. For example, the other material may include a polymer selected from polyolefins, polyesters, polyurethanes, polyamides, or combinations thereof. Alternatively, or additionally, the other material may include carbon in various forms, such as graphene.

The nanocellulose material incorporated into a nanocellulose-containing product may be at least partially hydrophobic via deposition of at least some of the lignin onto a surface of the cellulose-rich solids during step (b). Also, the nanocellulose material may be at least partially hydrophobic via deposition of at least some of the lignin onto a surface of the nanocellulose material during step (c) or step (d).

In some embodiments, step (d) comprises forming a film comprising the nanocellulose material, or a derivative thereof. The film is optically transparent and flexible, in certain embodiments.

In some embodiments, step (d) comprises forming a coating or coating precursor comprising the nanocellulose material, or a derivative thereof In some embodiments, the nanocellulose-containing product is a paper coating.

In some embodiments, the nanocellulose-containing product is configured as a catalyst, catalyst substrate, or co-catalyst. In some embodiments, the nanocellulose-containing product is configured electrochemically for carrying or storing an electrical current or voltage.

In some embodiments, the nanocellulose-containing product is incorporated into a filter, membrane, or other separation device.

In some embodiments, the nanocellulose-containing product is incorporated as an additive into a coating, paint, or adhesive. In some embodiments, the nanocellulose-containing product is incorporated as a cement additive.

In some embodiments, the nanocellulose-containing product is incorporated as a thickening agent or rheological modifier. For example, the nanocellulose-containing product may be an additive in a drilling fluid, such as (but not limited to) an oil recovery fluid and/or a gas recovery fluid.

The present invention also provides nanocellulose compositions. In some variations, a nanocellulose composition comprises nanofibrillated cellulose with a cellulose crystallinity of about 70% or greater. The nanocellulose composition may include lignin and sulfur.

The nanocellulose material may further contain some sulfonated lignin that is derived from sulfonation reactions with $SO_2$ (when used as the acid in fractionation) during the biomass digestion. The amount of sulfonated lignin may be about 0.1 wt % (or less), 0.2 wt %, 0.5 wt %, 0.8 wt %, 1 wt %, or more. Also, without being limited by any theory, it is speculated that a small amount of sulfur may chemically react with cellulose itself, in some embodiments.

In some variations, a nanocellulose composition comprises nanofibrillated cellulose and nanocrystalline cellulose, wherein the nanocellulose composition is characterized by an overall cellulose crystallinity of about 70% or greater. The nanocellulose composition may include lignin and sulfur.

In some variations, a nanocellulose composition comprises nanocrystalline cellulose with a cellulose crystallinity of about 80% or greater, wherein the nanocellulose composition comprises lignin and sulfur.

In some embodiments, the cellulose crystallinity is about 75% or greater, such as about 80% or greater, or about 85% or greater. In various embodiments, the nanocellulose composition is not derived from tunicates.

The nanocellulose composition of some embodiments is characterized by an average cellulose degree of polymerization from about 100 to about 1000, such as from about 300 to about 700 or from about 150 to about 250. In certain embodiments, the nanocellulose composition is characterized by a cellulose degree of polymerization distribution having a single peak. In certain embodiments, the nanocellulose composition is free of enzymes.

Other variations provide a hydrophobic nanocellulose composition with a cellulose crystallinity of about 70% or greater, wherein the nanocellulose composition contains nanocellulose particles having a surface concentration of lignin that is greater than a bulk (internal particle) concentration of lignin. In some embodiments, there is a coating or thin film of lignin on nanocellulose particles, but the coating or film need not be uniform.

The hydrophobic nanocellulose composition may have a cellulose crystallinity is about 75% or greater, about 80% or greater, or about 85% or greater. The hydrophobic nanocellulose composition may further include sulfur.

The hydrophobic nanocellulose composition may or may not be derived from tunicates. The hydrophobic nanocellulose composition may be free of enzymes.

In some embodiments, the hydrophobic nanocellulose composition is characterized by an average cellulose degree of polymerization from about 100 to about 1500, such as from about 300 to about 700 or from about 150 to about 250. The nanocellulose composition may be characterized by a cellulose degree of polymerization distribution having a single peak.

A nanocellulose-containing product may include any of the disclosed nanocellulose compositions. Many nanocellulose-containing products are possible. For example, a nanocellulose-containing product may be selected from the group consisting of a structural object, a foam, an aerogel, a polymer composite, a carbon composite, a film, a coating, a coating precursor, a current or voltage carrier, a filter, a membrane, a catalyst, a catalyst substrate, a coating additive, a paint additive, an adhesive additive, a cement additive, a paper coating, a thickening agent, a rheological modifier, an additive for a drilling fluid, and combinations or derivatives thereof Various embodiments to make nanocellulose will now be further described, without limitation as to the scope of the invention. These embodiments are exemplary in nature.

In some embodiments, a first process step is "cooking" (equivalently, "digesting") which fractionates the three lignocellulosic material components (cellulose, hemicellulose, and lignin) to allow easy downstream removal. Specifically, hemicelluloses are dissolved and over 50% are completely hydrolyzed; cellulose is separated but remains resistant to hydrolysis; and part of the lignin is sulfonated into water-soluble lignosulfonates.

The lignocellulosic material is processed in a solution (cooking liquor) of aliphatic alcohol, water, and sulfur dioxide. The cooking liquor preferably contains at least 10 wt %, such as at least 20 wt %, 30 wt %, 40 wt %, or 50 wt % of a solvent for lignin. For example, the cooking liquor may contain about 30-70 wt % solvent, such as about 50 wt % solvent. The solvent for lignin may be an aliphatic alcohol, such as methanol, ethanol, 1-propanol, 2-propanol, 1-butanol, 2-butanol, isobutanol, 1-pentanol, 1-hexanol, or cyclohexanol. The solvent for lignin may be an aromatic alcohol, such as phenol or cresol. Other lignin solvents are possible, such as (but not limited to) glycerol, methyl ethyl ketone, or diethyl ether. Combinations of more than one solvent may be employed.

Preferably, enough solvent is included in the extractant mixture to dissolve the lignin present in the starting material. The solvent for lignin may be completely miscible, partially miscible, or immiscible with water, so that there may be more than one liquid phase. Potential process advantages arise when the solvent is miscible with water, and also when the solvent is immiscible with water. When the solvent is water-miscible, a single liquid phase forms, so mass transfer of lignin and hemicellulose extraction is enhanced, and the downstream process must only deal with one liquid stream. When the solvent is immiscible in water, the extractant mixture readily separates to form liquid phases, so a distinct separation step can be avoided or simplified. This can be advantageous if one liquid phase contains most of the lignin and the other contains most of the hemicellulose sugars, as this facilitates recovering the lignin from the hemicellulose sugars.

The cooking liquor preferably contains sulfur dioxide and/or sulfurous acid ($H_2SO_3$). The cooking liquor preferably contains $SO_2$, in dissolved or reacted form, in a concentration of at least 3 wt %, preferably at least 6 wt %, more preferably at least 8 wt %, such as about 9 wt %, 10 wt %, 11 wt %, 12 wt %, 13 wt %, 14 wt %, 15 wt %, 20 wt %, 25 wt %, 30 wt % or higher. The cooking liquor may also contain one or more species, separately from $SO_2$, to adjust the pH. The pH of the cooking liquor is typically about 4 or less.

Sulfur dioxide is a preferred acid catalyst, because it can be recovered easily from solution after hydrolysis. The majority of the $SO_2$ from the hydrolysate may be stripped and recycled back to the reactor. Recovery and recycling translates to less lime required compared to neutralization of comparable sulfuric acid, less solids to dispose of, and less separation equipment. The increased efficiency owing to the inherent properties of sulfur dioxide mean that less total acid or other catalysts may be required. This has cost advantages, since sulfuric acid can be expensive. Additionally, and quite significantly, less acid usage also will translate into lower costs for a base (e.g., lime) to increase the pH following hydrolysis, for downstream operations. Furthermore, less acid and less base will also mean substantially less generation of waste salts (e.g., gypsum) that may otherwise require disposal.

In some embodiments, an additive may be included in amounts of about 0.1 wt % to 10 wt % or more to increase cellulose viscosity. Exemplary additives include ammonia, ammonia hydroxide, urea, anthraquinone, magnesium oxide, magnesium hydroxide, sodium hydroxide, and their derivatives.

The cooking is performed in one or more stages using batch or continuous digestors. Solid and liquid may flow cocurrently or countercurrently, or in any other flow pattern that achieves the desired fractionation. The cooking reactor may be internally agitated, if desired.

Depending on the lignocellulosic material to be processed, the cooking conditions are varied, with temperatures from about 65° C. to 190° C., for example 75° C., 85° C., 95° C., 105° C., 115° C., 125° C., 130° C., 135° C., 140° C., 145° C., 150° C., 155° C., 165° C. or 170° C., and corresponding pressures from about 1 atmosphere to about 15 atmospheres in the liquid or vapor phase. The cooking time of one or more stages may be selected from about 15 minutes to about 720 minutes, such as about 30, 45, 60, 90, 120, 140, 160, 180, 250, 300, 360, 450, 550, 600, or 700 minutes. Generally, there is an inverse relationship between the temperature used during the digestion step and the time needed to obtain good fractionation of the biomass into its constituent parts.

The cooking liquor to lignocellulosic material ratio may be selected from about 1 to about 10, such as about 2, 3, 4, 5, or 6. In some embodiments, biomass is digested in a pressurized vessel with low liquor volume (low ratio of cooking liquor to lignocellulosic material), so that the cooking space is filled with ethanol and sulfur dioxide vapor in equilibrium with moisture. The cooked biomass is washed in alcohol-rich solution to recover lignin and dissolved hemicelluloses, while the remaining pulp is further processed. In some embodiments, the process of fractionating lignocellulosic material comprises vapor-phase cooking of lignocellulosic material with aliphatic alcohol (or other solvent for lignin), water, and sulfur dioxide. See, for example, U.S. Pat. Nos. 8,038,842 and 8,268,125 which are incorporated by reference herein.

A portion or all of the sulfur dioxide may be present as sulfurous acid in the extract liquor. In certain embodiments, sulfur dioxide is generated in situ by introducing sulfurous acid, sulfite ions, bisulfite ions, combinations thereof, or a salt of any of the foregoing. Excess sulfur dioxide, following hydrolysis, may be recovered and reused. In some embodiments, sulfur dioxide is saturated in water (or aqueous solution, optionally with an alcohol) at a first temperature, and the hydrolysis is then carried out at a second, generally higher, temperature. In some embodiments, sulfur dioxide is sub-saturated. In some embodiments, sulfur dioxide is super-saturated. In some embodiments, sulfur dioxide concentration is selected to achieve a certain degree of lignin sulfonation, such as 1%, 2%, 3%, 4%, 5%, 6%, 7%, 8%, 9%, or 10% sulfur content. $SO_2$ reacts chemically with lignin to form stable lignosulfonic acids which may be present both in the solid and liquid phases.

The concentration of sulfur dioxide, additives, and aliphatic alcohol (or other solvent) in the solution and the time of cook may be varied to control the yield of cellulose and hemicellulose in the pulp. The concentration of sulfur dioxide and the time of cook may be varied to control the yield of lignin versus lignosulfonates in the hydrolysate. In some embodiments, the concentration of sulfur dioxide, temperature, and the time of cook may be varied to control the yield of fermentable sugars.

Once the desired amount of fractionation of both hemicellulose and lignin from the solid phase is achieved, the liquid and solid phases are separated. Conditions for the separation may be selected to minimize or enhance the reprecipitation of the extracted lignin on the solid phase. Minimizing lignin reprecipitation is favored by conducting separation or washing at a temperature of at least the glass-transition temperature of lignin (about 120° C.); conversely, enhancing lignin reprecipitation is favored by conducting separation or washing at a temperature less than the glass-transition temperature of lignin.

The physical separation can be accomplished either by transferring the entire mixture to a device that can carry out the separation and washing, or by removing only one of the phases from the reactor while keeping the other phase in place. The solid phase can be physically retained by appropriately sized screens through which liquid can pass. The solid is retained on the screens and can be kept there for successive solid-wash cycles. Alternately, the liquid may be retained and solid phase forced out of the reaction zone, with centrifugal or other forces that can effectively transfer the solids out of the slurry. In a continuous system, countercurrent flow of solids and liquid can accomplish the physical separation.

The recovered solids normally will contain a quantity of lignin and sugars, some of which can be removed easily by washing. The washing-liquid composition can be the same as or different than the liquor composition used during fractionation. Multiple washes may be performed to increase effectiveness. Preferably, one or more washes are performed with a composition including a solvent for lignin, to remove additional lignin from the solids, followed by one or more washes with water to displace residual solvent and sugars from the solids. Recycle streams, such as from solvent-recovery operations, may be used to wash the solids.

After separation and washing as described, a solid phase and at least one liquid phase are obtained. The solid phase contains substantially undigested cellulose. A single liquid phase is usually obtained when the solvent and the water are miscible in the relative proportions that are present. In that case, the liquid phase contains, in dissolved form, most of the lignin originally in the starting lignocellulosic material, as well as soluble monomeric and oligomeric sugars formed in the hydrolysis of any hemicellulose that may have been present. Multiple liquid phases tend to form when the solvent and water are wholly or partially immiscible. The lignin tends to be contained in the liquid phase that contains most of the solvent. Hemicellulose hydrolysis products tend to be present in the liquid phase that contains most of the water.

In some embodiments, hydrolysate from the cooking step is subjected to pressure reduction. Pressure reduction may be done at the end of a cook in a batch digestor, or in an external flash tank after extraction from a continuous digestor, for example. The flash vapor from the pressure reduction may be collected into a cooking liquor make-up vessel. The flash vapor contains substantially all the unreacted sulfur dioxide which may be directly dissolved into new cooking liquor. The cellulose is then removed to be washed and further treated as desired.

A process washing step recovers the hydrolysate from the cellulose. The washed cellulose is pulp that may be used for various purposes (e.g., paper or nanocellulose production). The weak hydrolysate from the washer continues to the final reaction step; in a continuous digestor this weak hydrolysate may be combined with the extracted hydrolysate from the external flash tank. In some embodiments, washing and/or separation of hydrolysate and cellulose-rich solids is conducted at a temperature of at least about 100° C., 110° C., or 120° C. The washed cellulose may also be used for glucose production via cellulose hydrolysis with enzymes or acids.

In another reaction step, the hydrolysate may be further treated in one or multiple steps to hydrolyze the oligomers into monomers. This step may be conducted before, during, or after the removal of solvent and sulfur dioxide. The solution may or may not contain residual solvent (e.g. alcohol). In some embodiments, sulfur dioxide is added or allowed to pass through to this step, to assist hydrolysis. In these or other embodiments, an acid such as sulfurous acid or sulfuric acid is introduced to assist with hydrolysis. In some embodiments, the hydrolysis is autohydrolyzed by heating under pressure. In some embodiments, no additional acid is introduced, but lignosulfonic acids produced during the initial cooking are effective to catalyze hydrolysis of hemicellulose oligomers to monomers. In various embodiments, this step utilizes sulfur dioxide, sulfurous acid, sulfuric acid at a concentration of about 0.01 wt % to 30 wt %, such as about 0.05 wt %, 0.1 wt %, 0.2 wt %, 0.5 wt %, 1 wt %, 2 wt %, 5 wt %, 10 wt %, or 20 wt %. This step may be carried out at a temperature from about 100° C. to 220° C., such as about 110° C., 120° C., 130° C., 140° C., 150° C., 160° C., 170° C., 180° C., 190° C., 200° C., or 210° C. Heating may be direct or indirect to reach the selected temperature.

The reaction step produces fermentable sugars which can then be concentrated by evaporation to a fermentation feedstock. Concentration by evaporation may be accomplished before, during, or after the treatment to hydrolyze oligomers. The final reaction step may optionally be followed by steam stripping of the resulting hydrolysate to remove and recover sulfur dioxide and alcohol, and for removal of potential fermentation-inhibiting side products. The evaporation process may be under vacuum or pressure, from about −0.1 atmospheres to about 10 atmospheres, such as about 0.1 atm, 0.3 atm, 0.5 atm, 1.0 atm, 1.5 atm, 2 atm, 4 atm, 6 atm, or 8 atm.

Recovering and recycling the sulfur dioxide may utilize separations such as, but not limited to, vapor-liquid disengagement (e.g. flashing), steam stripping, extraction, or combinations or multiple stages thereof. Various recycle ratios may be practiced, such as about 0.1, 0.2, 0.3, 0.4, 0.5, 0.6, 0.7, 0.8, 0.9, 0.95, or more. In some embodiments, about 90-99% of initially charged $SO_2$ is readily recovered by distillation from the liquid phase, with the remaining 1-10% (e.g., about 3-5%) of the $SO_2$ primarily bound to dissolved lignin in the form of lignosulfonates.

In a preferred embodiment, the evaporation step utilizes an integrated alcohol stripper and evaporator. Evaporated vapor streams may be segregated so as to have different concentrations of organic compounds in different streams. Evaporator condensate streams may be segregated so as to have different concentrations of organic compounds in different streams. Alcohol may be recovered from the evaporation process by condensing the exhaust vapor and returning to the cooking liquor make-up vessel in the cooking step. Clean condensate from the evaporation process may be used in the washing step.

In some embodiments, an integrated alcohol stripper and evaporator system is employed, wherein aliphatic alcohol is removed by vapor stripping, the resulting stripper product stream is concentrated by evaporating water from the stream, and evaporated vapor is compressed using vapor compression and is reused to provide thermal energy.

The hydrolysate from the evaporation and final reaction step contains mainly fermentable sugars but may also contain lignin depending on the location of lignin separation in the overall process configuration. The hydrolysate may be concentrated to a concentration of about 5 wt % to about 60 wt % solids, such as about 10 wt %, 15 wt %, 20 wt %, 25 wt %, 30 wt %, 35 wt %, 40 wt %, 45 wt %, 50 wt % or 55 wt % solids. The hydrolysate contains fermentable sugars.

Fermentable sugars are defined as hydrolysis products of cellulose, galactoglucomannan, glucomannan, arabinoglucuronoxylans, arabinogalactan, and glucuronoxylans into their respective short-chained oligomers and monomer products, i.e., glucose, mannose, galactose, xylose, and arabinose. The fermentable sugars may be recovered in purified form, as a sugar slurry or dry sugar solids, for example. Any known technique may be employed to recover a slurry of sugars or to dry the solution to produce dry sugar solids.

In some embodiments, the fermentable sugars are fermented to produce biochemicals or biofuels such as (but by no means limited to) ethanol, isopropanol, acetone, 1-butanol, isobutanol, lactic acid, succinic acid, or any other fermentation products. Some amount of the fermentation product may be a microorganism or enzymes, which may be recovered if desired.

When the fermentation will employ bacteria, such as *Clostridia* bacteria, it is preferable to further process and condition the hydrolysate to raise pH and remove residual $SO_2$ and other fermentation inhibitors. The residual $SO_2$ (i.e., following removal of most of it by stripping) may be catalytically oxidized to convert residual sulfite ions to sulfate ions by oxidation. This oxidation may be accomplished by adding an oxidation catalyst, such as $FeSO_4.7H_2O$, that oxidizes sulfite ions to sulfate ions. Preferably, the residual $SO_2$ is reduced to less than about 100 ppm, 50 ppm, 25 ppm, 10 ppm, 5 ppm, or 1 ppm.

In some embodiments, the process further comprises recovering the lignin as a co-product. The sulfonated lignin may also be recovered as a co-product. In certain embodiments, the process further comprises combusting or gasifying the sulfonated lignin, recovering sulfur contained in the sulfonated lignin in a gas stream comprising reclaimed sulfur dioxide, and then recycling the reclaimed sulfur dioxide for reuse.

The process lignin separation step is for the separation of lignin from the hydrolysate and can be located before or after the final reaction step and evaporation. If located after, then lignin will precipitate from the hydrolysate since alcohol has been removed in the evaporation step. The remaining water-soluble lignosulfonates may be precipitated by converting the hydrolysate to an alkaline condition (pH higher than 7) using, for example, an alkaline earth oxide, preferably calcium oxide (lime). The combined lignin and lignosulfonate precipitate may be filtered. The lignin and lignosulfonate filter cake may be dried as a co-product or burned or gasified for energy production. The hydrolysate from filtering may be recovered and sold as a concentrated sugar solution product or further processed in a subsequent fermentation or other reaction step.

Native (non-sulfonated) lignin is hydrophobic, while lignosulfonates are hydrophilic. Hydrophilic lignosulfonates may have less propensity to clump, agglomerate, and stick to surfaces. Even lignosulfonates that do undergo some condensation and increase of molecular weight, will still have an $HSO_3$ group that will contribute some solubility (hydrophilic).

In some embodiments, the soluble lignin precipitates from the hydrolysate after solvent has been removed in the evaporation step. In some embodiments, reactive lignosulfonates are selectively precipitated from hydrolysate using excess lime (or other base, such as ammonia) in the presence of aliphatic alcohol. In some embodiments, hydrated lime is used to precipitate lignosulfonates. In some embodiments, part of the lignin is precipitated in reactive form and the remaining lignin is sulfonated in water-soluble form.

The process fermentation and distillation steps are intended for the production of fermentation products, such as alcohols or organic acids. After removal of cooking chemicals and lignin, and further treatment (oligomer hydrolysis), the hydrolysate contains mainly fermentable sugars in water solution from which any fermentation inhibitors have been preferably removed or neutralized. The hydrolysate is fermented to produce dilute alcohol or organic acids, from 1 wt % to 20 wt % concentration. The dilute product is distilled or otherwise purified as is known in the art.

When alcohol is produced, such as ethanol, some of it may be used for cooking liquor makeup in the process cooking step. Also, in some embodiments, a distillation column stream, such as the bottoms, with or without evaporator condensate, may be reused to wash cellulose. In some embodiments, lime may be used to dehydrate product alcohol. Side products may be removed and recovered from the hydrolysate. These side products may be isolated by processing the vent from the final reaction step and/or the condensate from the evaporation step. Side products include furfural, hydroxymethyl furfural (HMF), methanol, acetic acid, and lignin-derived compounds, for example.

The glucose may be fermented to an alcohol, an organic acid, or another fermentation product. The glucose may be used as a sweetener or isomerized to enrich its fructose content. The glucose may be used to produce baker's yeast. The glucose may be catalytically or thermally converted to various organic acids and other materials.

When hemicellulose is present in the starting biomass, all or a portion of the liquid phase contains hemicellulose sugars and soluble oligomers. It is preferred to remove most of the lignin from the liquid, as described above, to produce a fermentation broth which will contain water, possibly some of the solvent for lignin, hemicellulose sugars, and various minor components from the digestion process. This fermentation broth can be used directly, combined with one or more other fermentation streams, or further treated. Further treatment can include sugar concentration by evaporation; addition of glucose or other sugars (optionally as obtained from cellulose saccharification); addition of various nutrients such as salts, vitamins, or trace elements; pH adjustment; and removal of fermentation inhibitors such as acetic acid and phenolic compounds. The choice of conditioning steps should be specific to the target product(s) and microorganism(s) employed.

In some embodiments, hemicellulose sugars are not fermented but rather are recovered and purified, stored, sold, or converted to a specialty product. Xylose, for example, can be converted into xylitol.

A lignin product can be readily obtained from a liquid phase using one or more of several methods. One simple technique is to evaporate off all liquid, resulting in a solid lignin-rich residue. This technique would be especially advantageous if the solvent for lignin is water-immiscible. Another method is to cause the lignin to precipitate out of solution. Some of the ways to precipitate the lignin include (1) removing the solvent for lignin from the liquid phase, but not the water, such as by selectively evaporating the solvent from the liquid phase until the lignin is no longer soluble; (2) diluting the liquid phase with water until the lignin is no longer soluble; and (3) adjusting the temperature and/or pH of the liquid phase. Methods such as centrifugation can then be utilized to capture the lignin. Yet another technique for removing the lignin is continuous liquid-liquid extraction to selectively remove the lignin from the liquid phase, followed by removal of the extraction solvent to recover relatively pure lignin.

Lignin produced in accordance with the invention can be used as a fuel. As a solid fuel, lignin is similar in energy content to coal. Lignin can act as an oxygenated component in liquid fuels, to enhance octane while meeting standards as a renewable fuel. The lignin produced herein can also be used as polymeric material, and as a chemical precursor for producing lignin derivatives. The sulfonated lignin may be sold as a lignosulfonate product, or burned for fuel value.

The present invention also provides systems configured for carrying out the disclosed processes, and compositions produced therefrom. Any stream generated by the disclosed processes may be partially or completed recovered, purified or further treated, and/or marketed or sold.

Certain nanocellulose-nucleating agent-containing products provide high transparency, good mechanical strength, and/or enhanced gas (e.g., $O_2$ or $CO_2$) barrier properties, for example. Certain nanocellulose-nucleating agent-containing products containing hydrophobic nanocellulose materials provided herein may be useful as anti-wetting and anti-icing coatings, for example.

Due to the low mechanical energy input, nanocellulose-containing products provided herein may be characterized by fewer defects that normally result from intense mechanical treatment.

Some embodiments provide nanocellulose-containing products with applications for sensors, catalysts, antimicrobial materials, current carrying and energy storage capabilities. Cellulose nanocrystals have the capacity to assist in the synthesis of metallic and semiconducting nanoparticle chains.

Some embodiments provide composites containing nanocellulose and a carbon-containing material, such as (but not limited to) lignin, graphite, graphene, or carbon aerogels.

Cellulose nanocrystals may be coupled with the stabilizing properties of surfactants and exploited for the fabrication of nanoarchitectures of various semiconducting materials.

The reactive surface of —OH side groups in nanocellulose facilitates grafting chemical species to achieve different surface properties. Surface functionalization allows the tailoring of particle surface chemistry to facilitate self-assembly, controlled dispersion within a wide range of matrix polymers, and control of both the particle-particle and particle-matrix bond strength. Composites may be transparent, have tensile strengths greater than cast iron, and have very low coefficient of thermal expansion. Potential applications include, but are not limited to, barrier films, antimicrobial films, transparent films, flexible displays, reinforcing fillers for polymers, biomedical implants, pharmaceuticals, drug delivery, fibers and textiles, templates for electronic components, separation membranes, batteries, supercapacitors, electroactive polymers, and many others.

Other nanocellulose-nucleating agent applications suitable to the present invention include reinforced polymers, high-strength spun fibers and textiles, advanced composite materials, films for barrier and other properties, additives for coatings, paints, lacquers and adhesives, switchable optical devices, pharmaceuticals and drug delivery systems, bone replacement and tooth repair, improved paper, packaging and building products, additives for foods and cosmetics, catalysts, and hydrogels.

Aerospace and transportation composites may benefit from high crystallinity. Automotive applications include nanocellulose composites with polypropylene, polyamide (e.g. Nylons), or polyesters (e.g. PBT).

Nanocellulose materials provided herein are suitable as strength-enhancing additives for renewable and biodegradable composites. The cellulosic nanofibrillar structures may function as a binder between two organic phases for improved fracture toughness and prevention of crack formation for application in packaging, construction materials, appliances, and renewable fibers.

Nanocellulose materials provided herein are suitable as transparent and dimensional stable strength-enhancing additives and substrates for application in flexible displays, flexible circuits, printable electronics, and flexible solar panels. Nanocellulose is incorporated into the substrate-sheets are formed by vacuum filtration, dried under pressure and calandered, for example. In a sheet structure, nanocellulose acts as a glue between the filler aggregates. The formed calandered sheets are smooth and flexible.

Nanocellulose materials provided herein are suitable for composite and cement additives allowing for crack reduction and increased toughness and strength. Foamed, cellular nanocellulose-concrete hybrid materials allow for lightweight structures with increased crack reduction and strength.

Strength enhancement with nanocellulose increases both the binding area and binding strength for application in high strength, high bulk, high filler content paper and board with enhanced moisture and oxygen barrier properties. The pulp and paper industry in particular may benefit from nanocellulose materials provided herein.

Nanofibrillated cellulose nanopaper has a higher density and higher tensile mechanical properties than conventional paper. It can also be optically transparent and flexible, with low thermal expansion and excellent oxygen barrier characteristics. The functionality of the nanopaper can be further broadened by incorporating other entities such as carbon nanotubes, nanoclay or a conductive polymer coating.

Porous nanocellulose may be used for cellular bioplastics, insulation and plastics and bioactive membranes and filters. Highly porous nanocellulose materials are generally of high interest in the manufacturing of filtration media as well as for biomedical applications, e.g., in dialysis membranes.

Nanocellulose materials provided herein are suitable as coating materials as they are expected to have a high oxygen barrier and affinity to wood fibers for application in food packaging and printing papers.

Nanocellulose materials provided herein are suitable as additives to improve the durability of paint, protecting paints and varnishes from attrition caused by UV radiation.

Nanocellulose materials provided herein are suitable as thickening agents in food and cosmetics products. Nanocellulose can be used as thixotropic, biodegradable, dimensionally stable thickener (stable against temperature and salt addition). Nanocellulose materials provided herein are suitable as a Pickering stabilizer for emulsions and particle stabilized foam.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein. The following references are hereby incorporated by reference in their entireties: "Rheological and Thermo-Mechanical Properties of Poly(lactic acid)/Lignin-Coated Cellulose Nanocrystal Composites", Gupta et al., *ACS Sustainable Chem. Eng.* 2017, 5(2), 1711-1720 with its Supplemental Information, and "Lignin-coated cellulose nanocrystals as promising nucleating agent for poly(lactic acid)", Gupta et al., *J. Therm. Anal. Calorim.* 2016, 126(3), 1243-1251.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

EXAMPLES

Example 1

Crystallization of Ingeo 2500HP PLA with 8:1 L-CNCs/LAK-301 and Comparison with Ingeo 2500HP PLA with 1% and 0.3% LAK-301

Materials and Methods. Spray dried, lignin-coated cellulose nanocrystals (L-CNCs) and PLA (Ingeo® biopolymer 2500HP provided by NatureWorks, Minnetonka, Minn.)

were dried in an oven at 90° C. for two hours before melt processing. LAK-301 (available from Takemoto, Gamagori, Japan) and the L-CNCs were mixed in varying ratios for this example and stirred at 90° C. for 2 hr.

Melt processing. High-torque melt mixing was carried out using a HAAKE Rheocord 90 at a constant speed of 40 revolutions per minute (rpm). Ingeo PLA and L-CNCs or L-CNCs/LAK-301 with a combined mass of 66 g were placed into a screw-capped jar and shaken by hand for one minute at room temperature. The mixing bowl on the melt mixer was pre-heated to 155° C. (~20° C. below $T_m$). The mixing blades were turned on at 40 rpm and the sample was added to the mixing bowl over two minutes. The mixing bowl was sealed and the sample mixed for an additional ten minutes. During this time, the melt mixer temperature increased to 175° C. Samples were prepared by processing a masterbatch of 5 wt % L-CNCs or L-CNCs/LAK-301 in 2500HP. The masterbatch was diluted via melt mixing with the appropriate the amount of neat 2500HP PLA to give 0.3 L-CNC/2500HP or 0.3 L-CNC/LAK-301/2500HP. Samples obtained after dilution were designated as 2500HP-LCNCs-0.3%, 2500HP-LCNCs-0.5%, 2500HP-LCNCs-0.75%, 2500HP-LCNCs-1.0%, and 2500HP-LCNCs-1.5%.

Differential Scanning Calorimetry (DSC). Samples were analyzed by hermetically sealing 10-12 mg of melt-mixed samples in Tzero aluminum pans. DSC measurements were obtained using a TA Instruments DSC Q 2000 Series DSC. The samples were heated to 200° C. and held isothermally for 5 minutes to remove the thermal history and then cooled to 25° C. at 10° C./min.

FIG. 1 is a DSC graph of neat 2500HP PLA (i.e. Nature-Works Ingeo® Biopolymer 2500HP, Minnetonka, Minn., US). The top curve is for cooling at 10° C./min from 200° C. to 25° C. after removing thermal history. The lower curve is for subsequent heating from 25° C. at 10° C./min.

Figure 2:
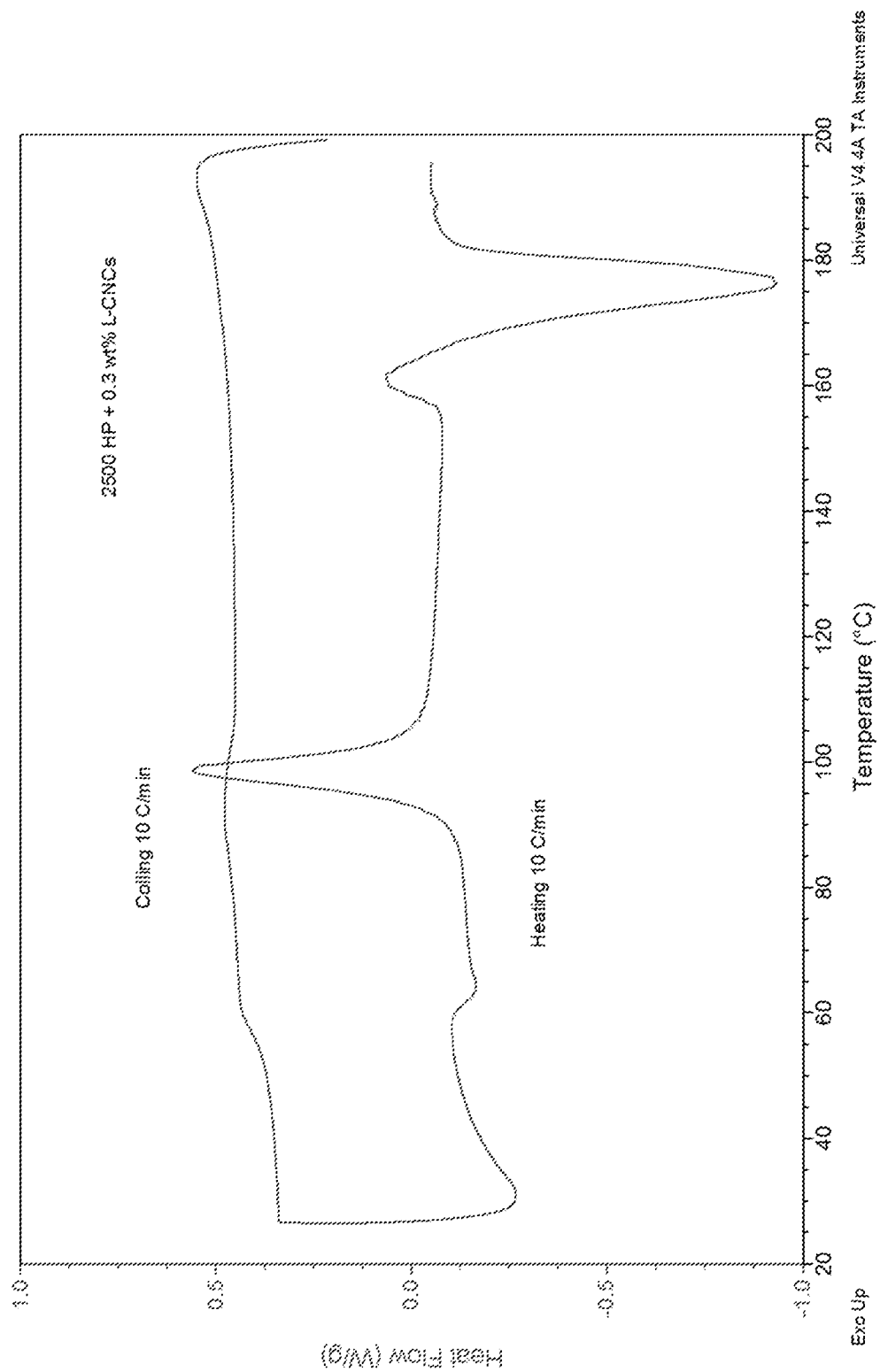
FIG. 2 is a DSC graph of 2500HP PLA with 0.3 wt % lignin-coated cellulose nanocrystals (L-CNCs), in Example 1 herein.

FIG. 2 is a DSC graph of 2500HP PLA with 0.3 wt % L-CNCs. The top curve is for cooling from 200° C. to 25° C. at 10° C./min after removing thermal history. The lower curve is for subsequent heating from 25° C. at 10° C./min.

Figure 3:
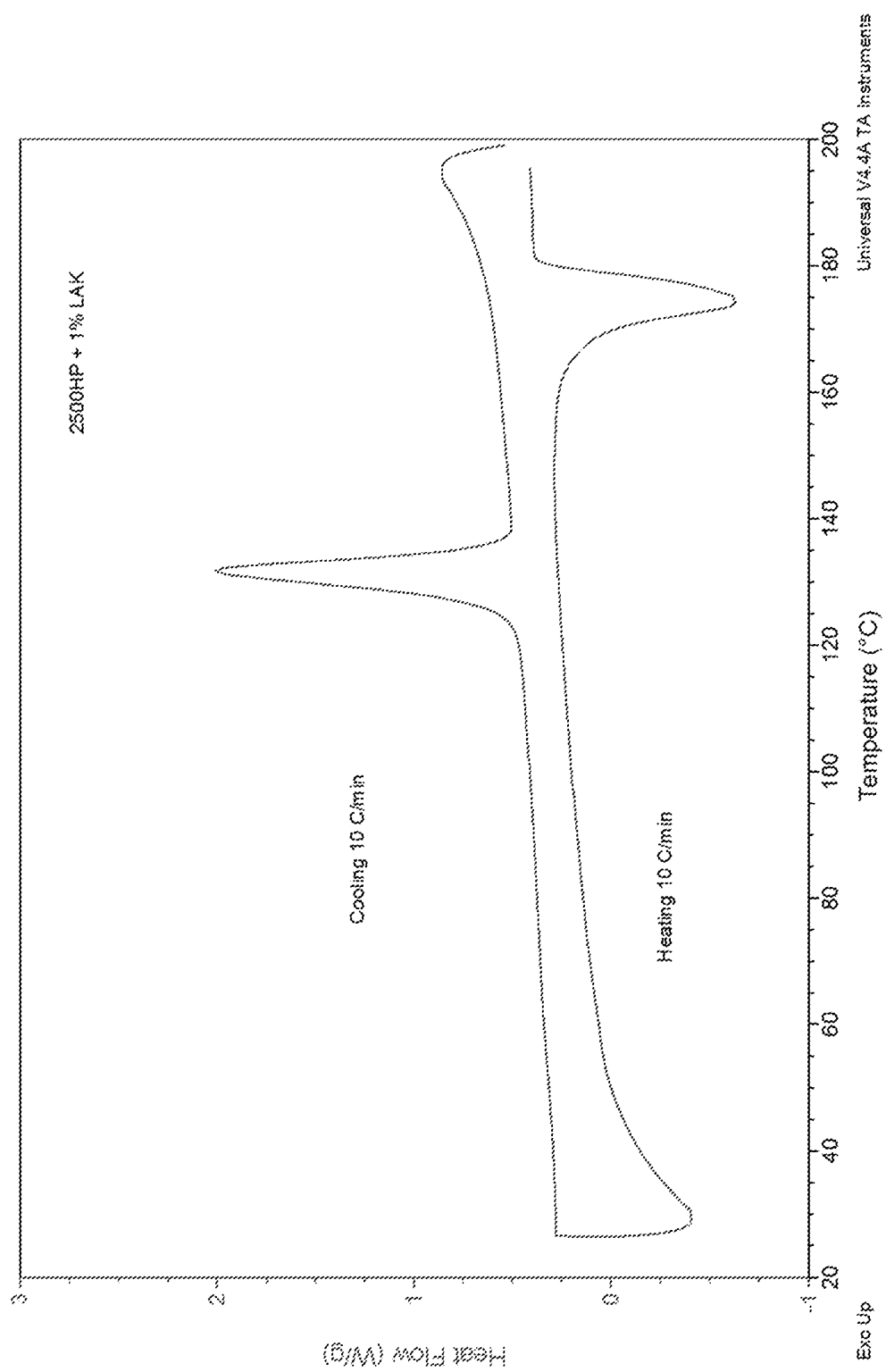
FIG. 3 is a DSC graph of 2500HP PLA with 1 wt % LAK-301 (dimethyl 5-sulfoisophthalate salt), in Example 1 herein.

FIG. 3 is a DSC graph of 2500HP PLA with 1 wt % LAK-301. The top curve is for cooling from 200° C. to 25° C. at 10° C./min after removing thermal history. The lower curve is for subsequent heating from 25° C. at 10° C./min.

Figure 4:
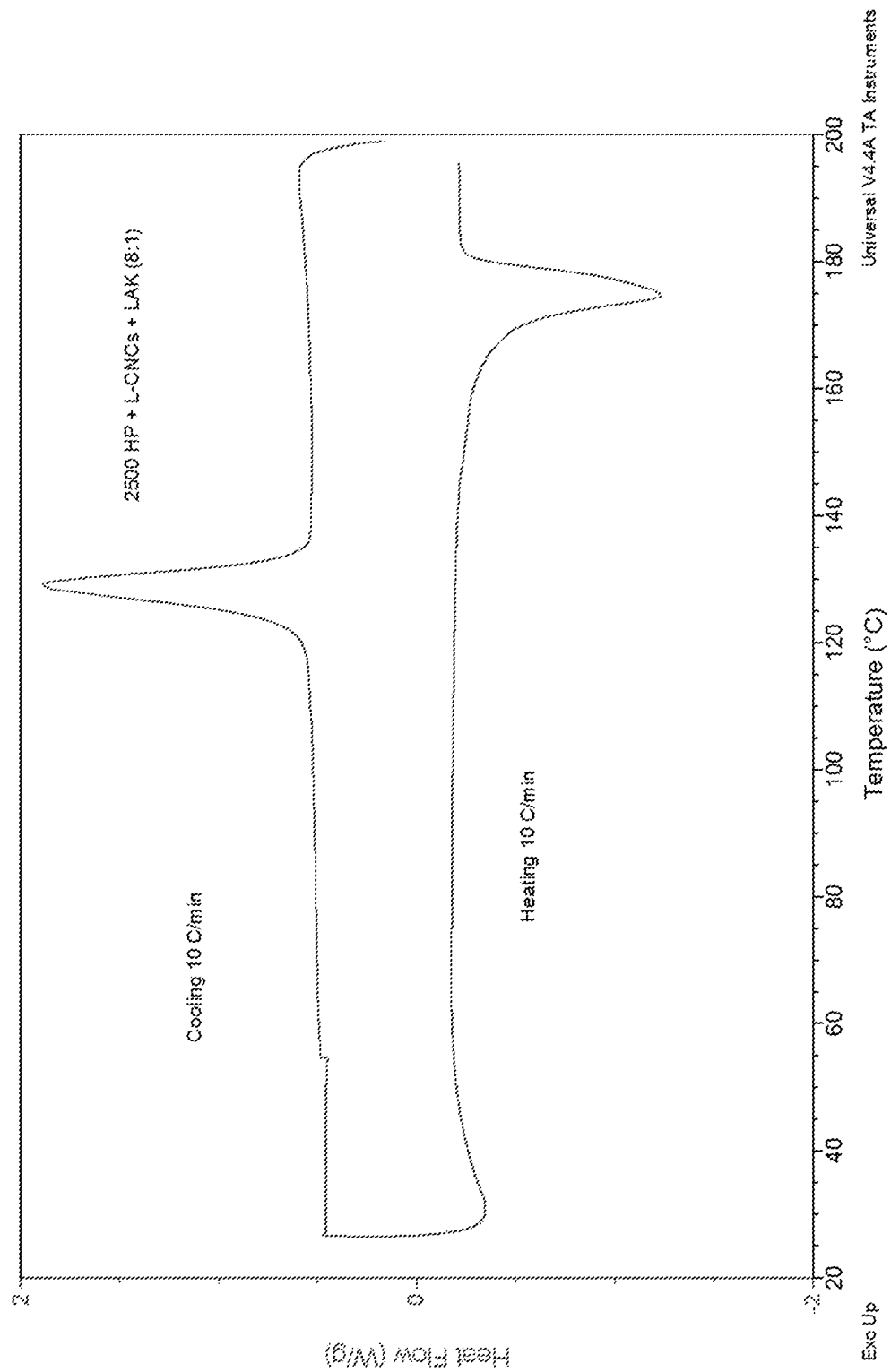
FIG. 4 is a DSC graph of 2500HP PLA with 0.3 wt % nucleating agent as 8:1 L-CNCs/LAK.

FIG. 4 is a DSC graph of 2500HP PLA with 0.3 wt % (8:1 L-CNCs/LAK). The top curve is for cooling from 200° C. to 25° C. at 10° C./min after removing thermal history. The lower curve is for subsequent heating from 25° C. at 10° C./min.

Figure 5:
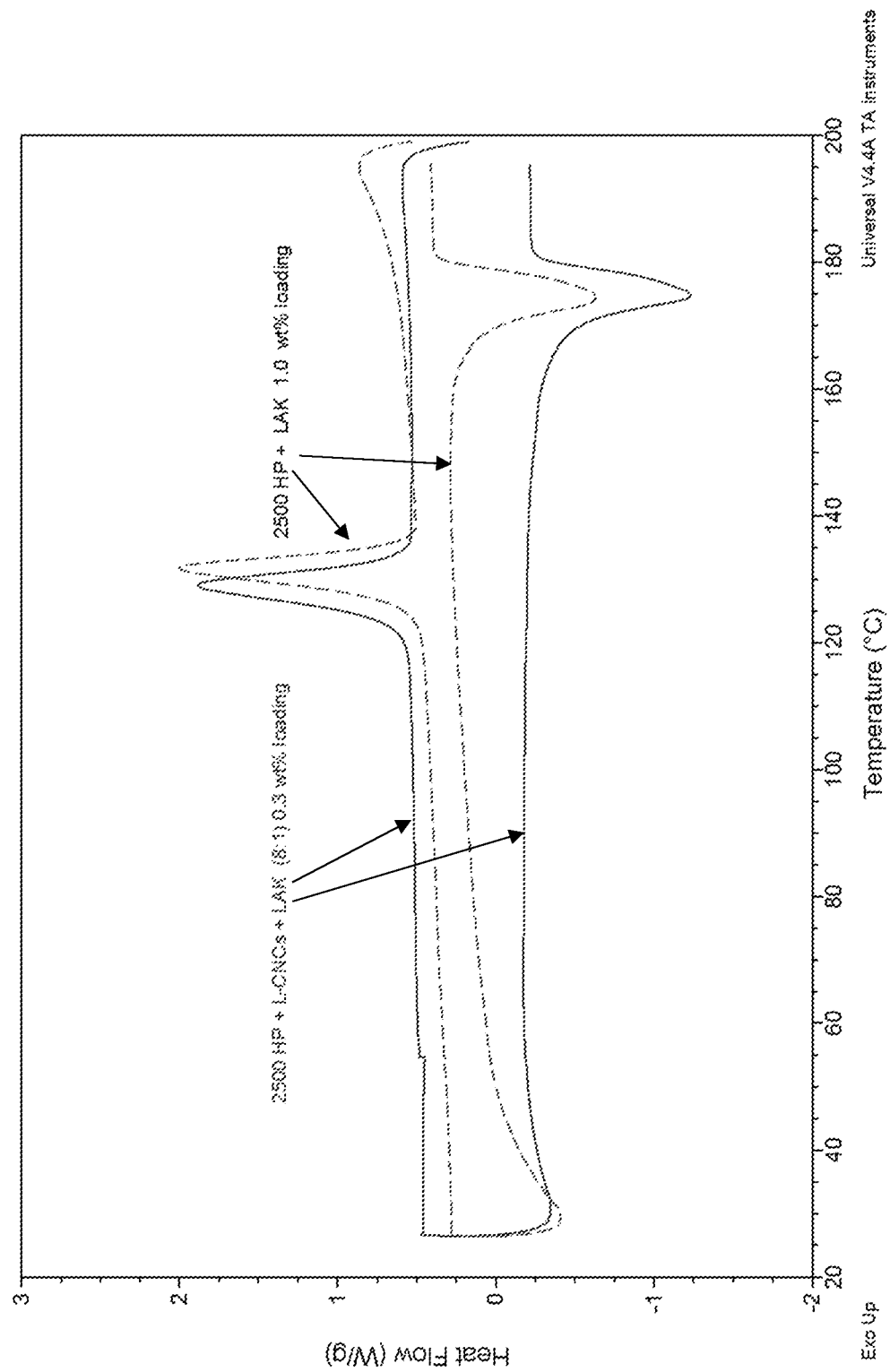
FIG. 5 is a DSC graph of 2500HP PLA with 1 wt % LAK-301 (dotted lines) and 2500 HP with 0.3 wt (8:1 L-CNCs/LAK-301) (solid lines), in Example 1 herein.

FIG. 5 is a DSC graph of 2500HP PLA with 1 wt % LAK (dotted lines) and 2500 HP with 0.3 wt (8:1 L-CNCs/LAK) (solid lines). The top curves are for cooling from 200° C. to 25° C. at 10° C./min after removing thermal history. The lower curves are for subsequent heating from 25° C. at 10° C./min.

Figure 6:
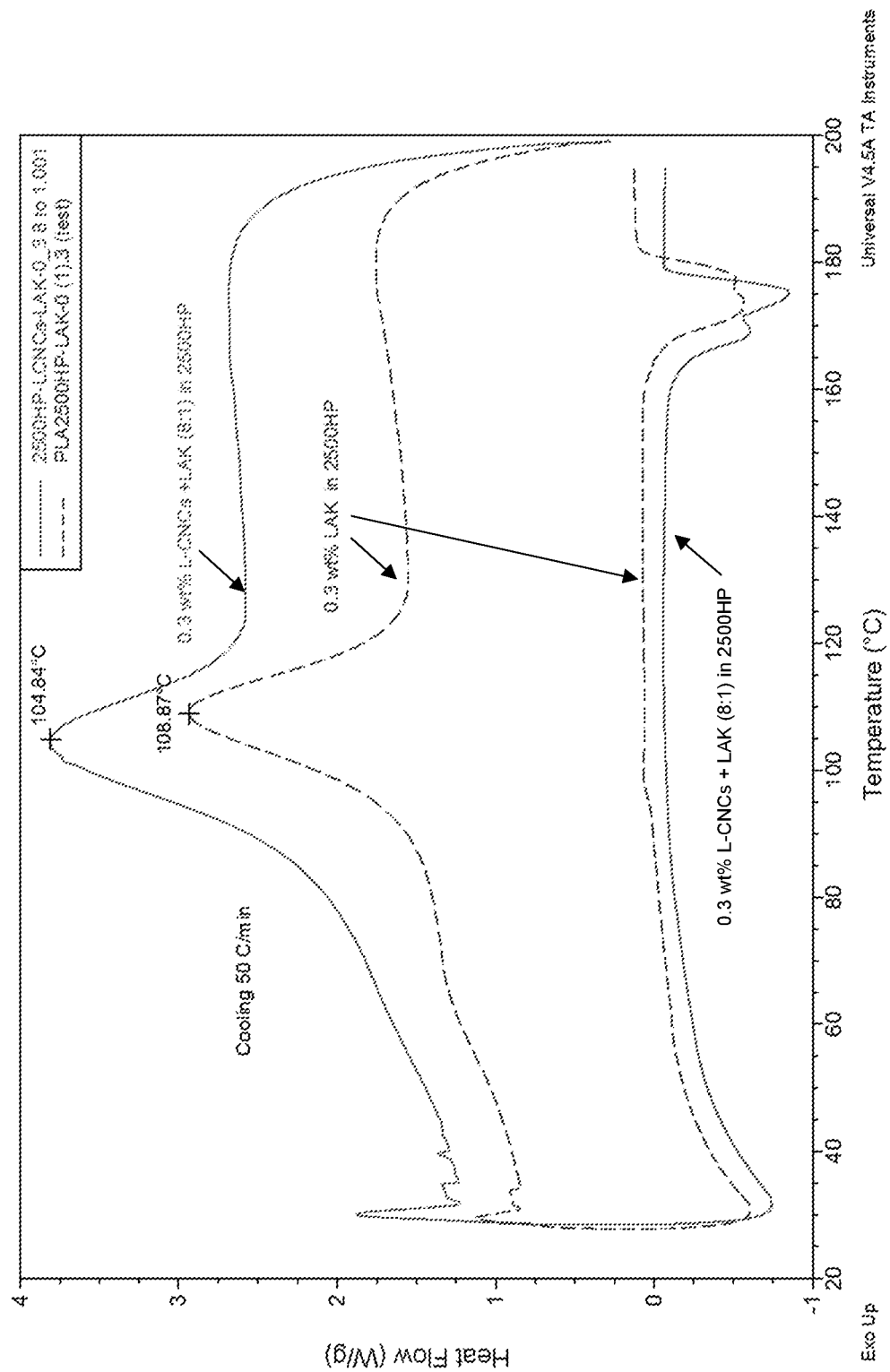
FIG. 6 is a DSC graph of 2500HP PLA with 0.3 wt % LAK-301 (dotted lines) and 2500 HP with 0.3 wt (8:1 L-CNCs/LAK-301) (solid lines), in Example 1 herein.

FIG. 6 is a DSC graph of 2500HP PLA with 0.3 wt % LAK (dotted lines) and 2500 HP with 0.3 wt % (8:1 L-CNCs/LAK) (solid lines). The top curves are for cooling from 200° C. to 25° C. at 50° C./min after removing thermal history. The lower curves are for subsequent heating from 25° C.

Isothermal Crystallization Kinetics. Samples were heated to 200° C. and held isothermally for 5 minutes to remove the thermal history and then cooled to the designated temperature at 50° C./min and then the heat flow vs. time collected at temperature. The Avrami equation was used to determine the Avrami exponent n and the rate constant k (min$^{-1}$) were determined and the half-life $t_{1/2}$ was calculated using $$t_{\frac{1}{2}} = \left(\frac{\ln(2)}{k}\right)^{1/n}.$$

TABLE 1

Glass Transition Temperature, $T_g$; Heat of Fusion, $\Delta H_m$; Cold Crystallization Temperature (Upon Heating), $T_{cc}$; Crystallization Temperature (On Cooling), $T_C$; Percent Crystallinity, % $X_c$ by DSC.

| Sample Designation | $T_g$ (° C.) | $\Delta H_m$ (J/g) | $T_{cc}$ (° C.) | $T_C$ (° C.) | $T_m$ (° C.) | % ($X_c$) |
|---|---|---|---|---|---|---|
| 2500HP (Neat) | 60.8 | 15.3 | — | — | 174.8 | 16.4 |
| 2500HP-LAK-0.3% | 69.6 | 45.2 | — | 130.3 | 174.4 | 48.6 |
| 2500HP-LAK-1.0% | 65.6 | 46.0 | — | 131.8 | 175.2 | 49.5 |
| 2500HP-LCNCs-0.3% | 60.8 | 54.8 | 98.7 | — | 176.2 | 58.9 |
| 2500HP-LCNCs-LAK-0.3% (1:1) | 62.1 | 49.9 | — | 121.0 | 170.6 | 53.7 |
| 2500HP-LCNCs-LAK-0.3% (8:1) | 67.7 | 55.9 | — | 128.7 | 174.8 | 60.1 |

LCNCs = Lignin-Coated Cellulose Nanocrystals
LAK = LAK-301, a salt of dimethyl 5-sulfoisophthalate

TABLE 2

Avrami Parameters for Isothermal Crystallization Kinetics.

| | T (° C.) | 2500 HP PLA, 0.3 wt % LAK-301 | 2500 HP PLA, 0.3 wt % (8:1 LCNCs/LAK-301) |
|---|---|---|---|
| n | 120 | 2.54 | 2.21 |
| | 130 | 2.4 | 2.17 |
| | 140 | 2.53 | 2.64 |
| | 145 | | 2.29 |
| k (/min) | 120 | 37.17 | 12.82 |
| | 130 | 9.63 | 7.32 |
| | 140 | 0.23 | 0.199 |
| | 145 | | 0.0619 |
| t ½ (min) | 120 | 0.208 | 0.267 |
| | 130 | 0.334 | 0.337 |
| | 140 | 1.54 | 1.60 |
| | 145 | | 2.87 |

The addition of L-CNCs to NatureWorks Ingeo® biopolymer 2500HP leads to only a negligible crystallization of the PLA upon cooling; however, it does nucleate cold crystallization upon heating giving 59% crystallinity vs. 16% crystallinity for the neat 2500 HP under the same conditions. Use of 0.3 wt % of an 8:1 mixture of L-CNCs/LAK-301 (total LAK-301 loading 0.033 wt %) as a nucleating agent in this PLA under the same DSC conditions as 1 wt % LAK-301 results in a 20% increase crystallinity on cooling at 10° C./min, while maintaining a similar crystallization temperature. With a cooling rate of 50° C./min, 0.3 wt % of an 8:1 mixture of L-CNCs/LAK-301 nucleated crystallization at a slightly lower temperature Tc max 104.8° C. vs. 108.9° C. Comparison of the isothermal crystallization kinetics for the 0.3 wt % 8:1 mixture of L-CNCs/LAK-301 in 2500HP and 0.3 wt % LAK-310 in 2500 HP found that at 130° C. and 140° C., the half-life for crystallization with the 0.3 wt % L-CNC/LAK systems is less than 1% and 4% slower than with 0.3 wt % LA-301K, respectively.

Example 2

Lignin-Coated Cellulose Nanocrystals as Nucleating Agent for Poly(Lactic Acid)

This example incorporates by reference "Lignin-coated cellulose nanocrystals as promising nucleating agent for poly(lactic acid)", Gupta et al., *J. Therm. Anal. Calorim.* 2016, 126(3), 1243-1251.

This example evaluates the effect of lignin-coated cellulose nanocrystals (L-CNCs) on the crystallization behavior of poly(lactic acid) (PLA). PLA/L-CNC nanocomposites were prepared by melt mixing, and the crystallization behavior of PLA was investigated using differential scanning calorimetry. Isothermal crystallization data were analyzed using Avrami and Lauritzen-Hoffman secondary nucleation theory, while the equilibrium melting temperature was determined using the nonlinear Hoffman-Weeks method.

The lignin-coated cellulose nanocrystals acted as a nucleating agent and significantly increased the rate of crystallization and degree of crystallinity of PLA in PLA/L-CNC nanocomposites. The Avrami exponent, n, increased in the presence of L-CNCs, displaying a conversion from lamellar morphology to two-dimensional crystal growth. In particular, the n value for neat PLA changed from 1 to 2 in the presence of L-CNCs, showing gradual growth from lamella to two-dimensional morphology. The higher value of the Avrami exponent, n, and overall rate of crystallization, k, for PLA/L-CNC nanocomposites as compared to neat PLA showed the nucleating behavior of L-CNCs. PLA/L-CNC nanocomposites also gave lower values of the nucleation parameters, $K_g$ and $\sigma_e$, calculated from secondary nucleation theory, due to a reduction in the activation energy for nucleation. This suggests that addition of L-CNCs lowered the energy requirement for chain folding for PLA chains.

The L-CNCs acted as a nucleating agent and catalyzed the bulk crystallization process of PLA, surprisingly resulting in an about sevenfold increase in the degree of crystallinity. The present example indicates that lignin-coated cellulose nanocrystals are an excellent nucleating agent for PLA and can help to achieve optimum physical properties and hydrolytic stability of PLA.

Example 3

Rheological and Thermo-Mechanical Properties of Poly(Lactic Acid)/Lignin-Coated Cellulose Nanocrystal Composites This example incorporates by reference "Rheological and Thermo-Mechanical Properties of Poly(lactic acid)/Lignin-Coated Cellulose Nanocrystal Composites", Gupta et al., *ACS Sustainable Chem. Eng.* 2017, 5(2), 1711-1720 with its Supplemental Information.

Lignin-coated CNCs were used to prepare PLA composites by a simple melt mixing process. Incorporation of L-CNCs into the PLA matrix resulted in significant improvement in rheological properties as both the complex viscosity and moduli increased in the presence of L-CNCs. A dramatic improvement in melt viscosity and storage modulus in the low-frequency region of the composite containing 0.7 wt % L-CNCs showed liquid-like to solid-like transition, indicating formation of a network structure. The rheological percolation concentration for the formation of L-CNCs network was determined using a power-law and was found to be 0.66 wt %, while the corresponding L-CNCs aspect ratio of ~65 was determined. Percolation at such a low loading is attributed to excellent dispersion and distribution of L-CNCs in the polymer matrix due to good compatibility between lignin and PLA matrix. Thermo mechanical properties showed that excellent dispersion of L-CNCs and a high degree of crystallinity of PLA composites led to a significant improvement in storage modulus of the composites. Crystallization behavior of the PLA matrix was also found to improve significantly in the presence of L-CNCs.

This example demonstrates that spray-dried lignin-coated cellulose nanocrystals (L-CNCs) effectively modify the rheological and thermo-mechanical properties of poly(lactic acid) (PLA) composites. The lignin coating on CNCs not only improved the dispersion of CNCs, but also enhanced their interfacial interaction with the PLA matrix, resulting in a significant improvement in rheological and thermo-mechanical properties.

The rheological percolation threshold concentration obtained by power law analysis for PLA/L-CNC composites was found to be 0.66 wt %, which is significantly lower than the reported values for other PLA/CNC composites. Such a low rheological percolation concentration of L-CNCs can be attributed to excellent dispersion of L-CNCs in the PLA matrix. Addition of only 0.5 wt % L-CNCs to the PLA matrix resulted in an almost 60% improvement in storage modulus, relative to neat PLA, as measured by dynamic mechanical analysis. This improvement in mechanical properties can be attributed to a significant increase in the degree of crystallinity of the PLA.

Excellent dispersion and compatibility of L-CNCs with PLA allowed generation of a high density of nucleating sites resulting in an increase in the degree of crystallinity of the PLA matrix. Improvement in the storage modulus at higher loading of L-CNCs can be attributed to both high crystallinity and reinforcement by L-CNCs. A fully bio-based, transparent and potentially biodegradable PLA film was prepared through film blowing by addition of just 0.3 wt % L-CNCs in the PLA matrix. This example clearly demonstrates that L-CNCs can serve as excellent functional fillers for PLA for the development of fully bio-based composites.

What is claimed is:

1. A polylactide composition comprising from about 50 wt % to about 99.9 wt % polylactide, from about 0.1 wt % to about 0.7 wt % hydrophobic, lignin-containing nanocellulose as a first nucleating agent, and from about 0.01 wt % to about 0.1 wt % of an aromatic sulfonic acid or salt thereof as a second nucleating agent, wherein the weight ratio of said first nucleating agent to said second nucleating agent is greater than 1.

2. The polylactide composition of claim 1, wherein said first nucleating agent is present from about 0.1 wt % to about 0.5 wt %.

3. The polylactide composition of claim 1, wherein said second nucleating agent is present from about 0.02 wt % to about 0.05 wt %.

4. The polylactide composition of claim 1, wherein the total concentration of said first nucleating agent and said second nucleating agent is from about 0.2 wt % to about 0.8 wt %.

5. The polylactide composition of claim 4, wherein the total concentration of said first nucleating agent and said second nucleating agent is from about 0.3 wt % to about 0.5 wt %.

6. The polylactide composition of claim 1, wherein the weight ratio of said first nucleating agent to said second nucleating agent is from about 20 to about 2.

7. The polylactide composition of claim 6, wherein the weight ratio of said first nucleating agent to said second nucleating agent is about 8.

8. The polylactide composition of claim 1, wherein said an aromatic sulfonic acid or salt thereof is selected from the group consisting of dimethyl 5-sulfoisophthalate, p-toluene sulfonate, dodecylbenzenesulfonic acid, 3-sulfobenzoic acid, phenylphosphonic acid, dimethyl 5-sulfoisophthalate, and combinations thereof.

9. The polylactide composition of claim 8, wherein said aromatic sulfonic acid or salt thereof is dimethyl 5-sulfoisophthalate in acid or salt form.

10. The polylactide composition of claim 1, wherein said hydrophobic, lignin-containing nanocellulose is lignin-coated nanocellulose.

11. The polylactide composition of claim 1, wherein said hydrophobic, lignin-containing nanocellulose includes sulfonated lignin that is chemically and/or physically bonded to said hydrophobic, lignin-containing nanocellulose.

12. The polylactide composition of claim 1, wherein said polylactide composition includes a co-polymer that is derived from co-polymerization of a non-lactide monomer with lactide.

13. The polylactide composition of claim 1, wherein said composition further comprises one or more additives selected from the group consisting of compatibilizers, plasticizers, fillers, antioxidants, colorants, flame retardants, and combinations thereof.

14. The polylactide composition of claim 1, wherein said composition further comprises one or more additives selected from the group consisting of glass fibers, mica, talc, metal powder, silica, calcium carbonate, carbon, wollastonite, stearates, and combinations thereof.

15. The polylactide composition of claim 1, wherein said composition is in the form of a blend, masterbatch, pellet, extrusion feed, molding feed, extruded part, injection-molded part, blow-molded part, spun fiber, layered sheet, film, foam, container, bag, engineered part, 3D-printing substrate, 3D-printed part, or a combination thereof.

16. A polymer composition comprising from about 50 wt % to about 99.9 wt % polymer, from about 0.1 wt % to about 0.7 wt % hydrophobic, lignin-containing nanocellulose as a dispersing agent, from about 0.01 wt % to about 0.1 wt % of an aromatic sulfonic acid or salt thereof as a nucleating agent, and from about 0.01 wt % to about 20 wt % of one or more additives selected from the group consisting of additional nucleating agents, compatibilizers, plasticizers, fillers, antioxidants, colorants, flame retardants, and combinations thereof, wherein the weight ratio of said hydrophobic, lignin-containing nanocellulose to said aromatic sulfonic acid or salt thereof is 1 or greater.

17. A polymer nucleating agent comprising from about 50 wt % to about 99 wt % hydrophobic, lignin-containing nanocellulose and from about 1 wt % to about 50 wt % of an aromatic sulfonic acid or salt thereof, wherein said aromatic sulfonic acid or salt thereof is selected from the group consisting of dimethyl 5-sulfoisophthalate, p-toluene sulfonate, dodecylbenzenesulfonic acid, 3-sulfobenzoic acid, phenylphosphonic acid, dimethyl 5-sulfoisophthalate, and combinations thereof, and wherein the weight ratio of said hydrophobic, lignin-containing nanocellulose to said aromatic sulfonic acid or salt thereof is greater than 1.

* * * * *